US011869123B2

(12) United States Patent
Agarwal et al.

(10) Patent No.: US 11,869,123 B2
(45) Date of Patent: Jan. 9, 2024

(54) ANTI-ALIASING TWO-DIMENSIONAL VECTOR GRAPHICS USING A COMPRESSED VERTEX BUFFER

(71) Applicant: Adobe Inc., San Jose, CA (US)

(72) Inventors: Harish Agarwal, Jaipur (IN); Saurabh Gupta, Aligarh (IN); Himanshu Verma, Delhi (IN)

(73) Assignee: Adobe Inc., San Jose, CA (US)

( * ) Notice: Subject to any disclaimer, the term of this patent is extended or adjusted under 35 U.S.C. 154(b) by 255 days.

(21) Appl. No.: 17/444,353

(22) Filed: Aug. 3, 2021

(65) Prior Publication Data
US 2023/0038647 A1    Feb. 9, 2023

(51) Int. Cl.
G06T 11/20    (2006.01)
G06T 17/20    (2006.01)
G06T 1/20    (2006.01)
G06T 15/00    (2011.01)
G06T 15/04    (2011.01)

(52) U.S. Cl.
CPC ............ G06T 11/203 (2013.01); G06T 1/20 (2013.01); G06T 15/005 (2013.01); G06T 15/04 (2013.01); G06T 17/20 (2013.01)

(58) Field of Classification Search
None
See application file for complete search history.

(56) References Cited

U.S. PATENT DOCUMENTS

| 5,392,393 | A  | * | 2/1995  | Deering | ............... G06T 15/005 |
|           |    |   |         |         | 345/506 |
| 8,044,955 | B1 |   | 10/2011 | Yhann   | |
| 9,275,498 | B2 | * | 3/2016  | Ceylan  | ................. G06T 11/203 |
| 11,417,058| B2 |   | 8/2022  | Kumar et al. | |
| 2008/0309676 | A1 | * | 12/2008 | Nehab | ...................... G06T 9/00 |
|           |    |   |         |         | 345/611 |
| 2014/0204080 | A1 |   | 7/2014 | Goel et al. | |
| 2014/0267266 | A1 |   | 9/2014 | Crassin et al. | |
| 2015/0145880 | A1 |   | 5/2015 | Smith et al. | |
| 2015/0178974 | A1 |   | 6/2015 | Goel et al. | |

(Continued)

OTHER PUBLICATIONS

OpenGL [website]. "OpenGL®: The Industry's Foundation for High Performance Graphics—From Games to Virtual Reality, Mobile Phones to Supercomputers", The Khronos Group. URL: https://opengl.org/ [accessed Jul. 7, 2022].

(Continued)

Primary Examiner — Robert Bader
(74) Attorney, Agent, or Firm — Weaver Austin Villeneuve & Sampson LLP

(57) ABSTRACT

Techniques for rendering two-dimensional vector graphics are described. The techniques include using a central processing unit to generate tessellate triangles along a vector path in which each of the tessellate triangles is represented by a set of vertices. From the tessellate triangles, an index buffer and a compressed vertex buffer are generated. The index buffer includes a vertex index for each vertex of each of the tessellate triangles. The compressed vertex buffer includes a vertex buffer entry for each unique vertex that maps to one or more vertex indices of the index buffer. The index buffer and the compressed vertex buffer are provided to a graphics processing unit to render the vector path with anti-aliasing.

18 Claims, 13 Drawing Sheets

(56) References Cited

U.S. PATENT DOCUMENTS

2018/0033168 A1    2/2018  Beri et al.
2022/0084283 A1    3/2022  Kumar et al.

OTHER PUBLICATIONS

Apple Developer Website: "Metal: Accelerating graphics and much more." <URL: https://developer.apple.com/metal/> [retrieved Aug. 2, 2021].
OpenGL: "Geometry shaders" <URL: https://open.gl/geometry> [retrieved on Aug. 2, 2021].
Nehab, D., et al., "Random-Access Rendering of General Vector Graphics", *ACM Transactions on Graphics*, vol. 27, Issue 5, Article No. 135, Dec. 2008, pp. 1-10 <URL: http://hhoppe.com/ravg.pdf> [retrieved on Aug. 2, 2021].
Wikipedia: The Free Encyclopedia, "Vatti clipping algorithm" <URL: https://en.wikipedia.org/wiki/Vatti_clipping_algorithm>[retrieved on Aug. 2, 2021].
U.S. Appl. No. 17/019,881, filed Sep. 14, 2020, Kumar et al.
Pre-Interview First Office Action dated Apr. 14, 2021 in U.S. Appl. No. 17/019,881, 9 pages.
First Action Interview-Office Action dated Jun. 4, 2021 in U.S. Appl. No. 17/019,881, 8 pages.
Final Office Action dated Sep. 1, 2021 in U.S. Appl. No. 17/019,881, 48 pages.
Non-Final Office Action dated Dec. 23, 2021 in U.S. Appl. No. 17/019,881, 44 pages.
Notice of Allowance dated Apr. 13, 2022 in U.S. Appl. No. 17/019,881, 10 pages.

\* cited by examiner

ANTI-ALIASING TWO-DIMENSIONAL VECTOR GRAPHICS USING A COMPRESSED VERTEX BUFFER

BACKGROUND

Computing systems typically render two-dimensional vector paths such as line and curves on a display using a graphics processing unit (GPU). If the pixels lying on the curve are merely rendered as marked along the curve, the vectors paths would appear jagged and distorted, especially when the resolution is adjusted for the display. To smoothen the curve around the edges and improve the appearance of the transitions to the surrounding pixels, extra pixels are marked and colored with a gradient to enhance the visual effect. Such techniques are referred to as anti-aliasing a vector path.

To render vector paths with resolution independent anti-aliasing, some GPUs utilize geometry shaders such as the "OpenGL" application programming interfaces (APIs). However, to utilize a geometry shader, the GPU framework has to support the geometry shader APIs. Other solutions utilize a central processing unit (CPU) to perform geometry expansion and prepare multi-vertex data of the expanded geometry for a GPU to process and render. Such solutions require a large amount of data to be transferred from the CPU to the GPU, which increases the memory storage demands and incurs memory access latencies to transfer the large amount of data.

SUMMARY

Techniques for rendering two-dimensional vector graphics are described. In some implementations, a central processing unit (CPU) tessellates a vector graphic by generating tessellate triangles along vector paths, and prepares data for a graphics processing unit (GPU) to perform anti-aliasing for rendering the vector graphic on a display device. The data structure prepared by the CPU for the GPU includes an index buffer and a compressed vertex buffer. The index buffer includes a vertex index for each vertex of each of the tessellate triangles. The compressed vertex buffer has a vertex buffer entry for each unique vertex that maps to one or more vertex indices in the index buffer. Duplicate vertices are excluded from the compressed vertex buffer. Utilizing such a data structure improves memory usage efficiency and reduces the latency of transferring data from the CPU to the GPU. Such techniques also do not require the use of geometry shaders, and thus can be employed in various GPU frameworks.

Additional features and advantages of the techniques for rendering two-dimensional vector graphics will be set forth in the description below.

BRIEF DESCRIPTION OF THE DRAWINGS

Various embodiments in accordance with the present disclosure will be described with reference to the drawings, in which.

DETAILED DESCRIPTION

Figure 1:
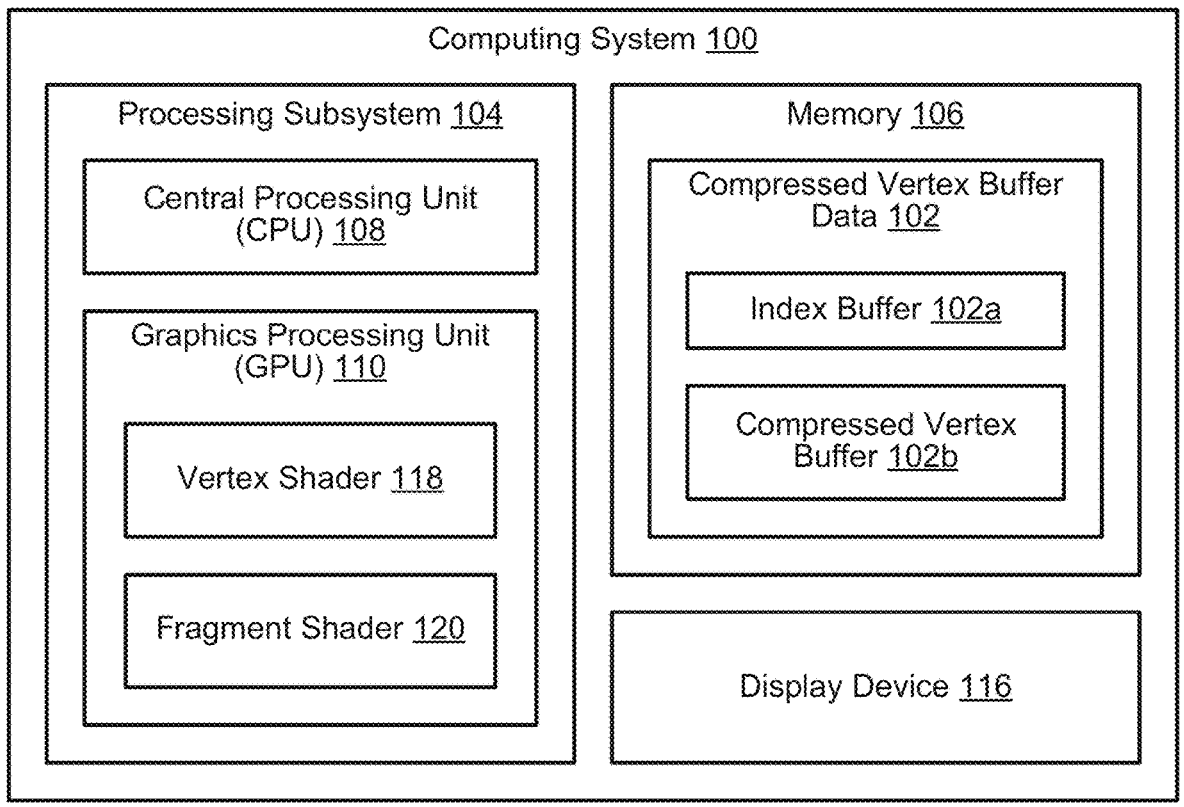
FIG. 1 illustrates an example of a system environment that uses compressed vertex data for rendering vector graphics, in accordance with some implementations.

The vector graphics techniques of the present disclosure utilize a compressed vertex buffer to reduce the amount of data being transferred to the graphics processing unit (GPU) for anti-aliasing. A central processing unit (CPU) is used to tessellate a vector path by generating tessellate triangles along the vector path. An index buffer is generated to store indices for each vertex of the tessellate triangles, and a compressed vertex buffer is generated to store vertex attributes for the vertices of the tessellate triangles. Each entry in the compressed vertex buffer corresponds to a unique vertex of the tessellate triangles. As such, there are no duplicate vertices in the compressed vertex buffer. For a vertex that is shared by multiple tessellate triangles, multiple indices in the index buffer are used to represent the vertex for each tessellate triangle, but the indices all point to the same vertex buffer entry in the compressed vertex buffer.

As compared to a multi-vertex buffer system that stores entries corresponding to triangles (which would include vertex attributes for every vertex of the triangles including duplicate vertices of adjacent triangles), the compressed vertex buffer utilizes less memory and reduces the number of memory accesses needed to transfer the vertex data from the CPU to the GPU. For example, a simple curve segment is tessellated with three adjacent triangles including two exterior triangles and an interior triangle. To perform anti-aliasing, the exterior triangles are replicated for geometry expansion. As such, the vertex data being transferred from the CPU to the GPU in the multi-vertex buffer system contains fifteen vertices (three vertices per triangle). However, because the triangles are adjacent to each other and two of the triangles are replicas, only five of the fifteen vertices are actually unique vertices. By utilizing the compressed vertex buffer described herein, the vertex attributes for the simple curve segment are reduced from fifteen vertices to five unique vertices by excluding duplicate vertexes from the tessellate triangles in the compressed vertex buffer. This allows the memory footprint for implementing the vertex buffer to be reduced significantly, especially for complex vectors that include hundreds or thousands of adjacent triangles. The reduction in buffer size also reduces the number of clock cycles needed to transfer the data from the CPU to the GPU to improve processing latency.

The compressed vertex buffer also allows anti-aliasing to be performed without utilizing a geometry shader. Upon tessellating a vector path and generating the index buffer and compressed vertex buffer for the tessellated triangles, the CPU issues two draw calls per index in the index buffer to a vertex shader of the GPU. In other words, the CPU issues draw calls for twice the index count stored in the index buffer. This generates a replica triangle for each tessellate triangle. A triangle selection process is then performed to select the exterior triangles and their replicas for geometry expansion. Interior triangles and their replicas are not selected for geometry expansion because geometry expansion for such is not needed for anti-aliasing. Rendering parameters for the selected triangles are generated by referencing entries in the compressed vertex buffer corresponding to the vertexes of the selected triangles. The rendering parameters are then provided to a fragment shader to render two-dimensional graphics with anti-aliasing. Accordingly, a geometry shader is not used for anti-aliasing, and the techniques disclosed herein are compatible with GPU frameworks that lack support for geometry shaders.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100 on which the compressed vertex buffer techniques are implemented. Computing system 100 includes a processing subsystem 104, a memory 106, and a display device 116. In some implementations, computing system 100 includes other component(s) that are not specially shown. In some embodiments, multiple components (including any components shown in FIG. 1 and/or any component not specifically shown) are combined into one component, and/or one or more components are separated into multiple components.

Processing subsystem 104 includes a central processing unit (CPU) 108 and a graphics processing unit (GPU) 110. CPU 108 includes one or more processors or processor cores that execute instructions to control the functionalities and components of computing system 100. During operation, an application for presenting, generating, and/or editing digital images can be invoked to render images on display device 116. Examples of such applications include a portable document format (PDF) viewer/editor, a Scalable Vector Graphics (SVG) viewer/editor, or a encapsulated postscript (EPS) viewer/editor, etc. The application can be invoked on computing system 100, or on another device communicatively coupled (e.g., via a network) to computing system 100. Invoking the application causes computing system 100 to process image data associated with a two-dimensional vector graphic. According to some embodiments, a vector graphic is a two-dimensional digital image including one or more graphics defined by one or more vectors (e.g., mathematical curves and lines). A vector graphic has one or more vector drawing segments that represent straight lines or curves. Vector graphics employ mathematical equations to represent edges, rather than a grid of pixels. Common examples of vector file formats include SVG, EPS, and PDF files.

Computing system 100 processes a vector graphic by using CPU 108 to generating tessellate triangles along the vector paths to form a tessellated geometry. In some embodiments, a vector path is a continuous function that extends from an initial point to a terminal point. For example, a vector path includes one or more drawing segments (e.g., straight lines or curved lines) based on one or more sets of vector parameters. Additionally, one or more vector paths in a vector graphic define one or more shapes within the vector graphic, including strokes and/or boundaries of objects. In some implementations, a path includes one or more Bezier curves and/or one or more straight lines. In other embodiments, a path includes other representations of curved/straight lines including Hermite curves, B-splines, non-uniform rational basis splines, Kappa-curves, Catmull-Rom splines or another parameter curve.

CPU 108 also prepares data representing the two-dimensional vector graphic in a format for GPU 110 to process. For example, CPU 108 generates compressed vertex buffer data 102 for transfer to GPU 110 for subsequent processing, and issues draw calls to GPU 110 to render two-dimensional vector graphics on display device 116. In some implementations, compressed vertex buffer data 102 includes an index buffer 102a associated with a compressed vertex buffer 102b to store vertex attributes for vertices of the vector graphic. According to some embodiments, a vertex is a point belonging to a primitive in a tessellated geometry. Examples of a vertex includes a single point, an endpoint of a line, or a corner of a triangle, etc.

GPU 110 includes one or more graphics processors, which is a type of acceleration circuit tailored for graphics rendering, and performs graphics computations more efficiently that CPU 108. By having a GPU in computing system 110, some of the graphics computations used for rendering the image on a display are offloaded from CPU 108. In some implementations, GPU 110 utilizes a vertex shader 118 and fragment shader 120. Vertex shader 118 is a programmable stage in a rendering pipeline of GPU 110 for processing individual vertices of an input geometry. In some embodiments, each vertex in a geometry passed to GPU 110 is processed by an individual invocation of vertex shader 118. Vertex shader 118 transforms vertex positions for rendering on a two-dimensional display, and manipulates properties such as position, color, and texture. Vertex shader 118 generates rendering parameters based on the input geometry for a subsequent stage of a rendering pipeline. Examples of rendering parameters include texture coordinate data, barycentric coordinate data, and whether a vertex belongs to a line primitive or degenerate primitive. Fragment shader 120 is a programmable stage in a rendering pipeline of GPU 110 for rendering an input geometry on a display device. In some embodiments, fragment shader 120 generates fragments from primitives in an input geometry that correspond to pixels in a frame buffer for rendering at pixel locations of a display device. Fragment shader 120 thus utilizes rendering parameters from a vertex shader to determine display values (e.g., color values) for displaying at each pixel location of the display device.

Display device 116 is a device that displays information based on the output of the rendering pipeline of GPU 110. In some implementations, display device 116 is integrated as part of computing system 100, or is a separate device that is communicatively coupled to computing system 100. Examples of display device include a computer monitor, a laptop display for a laptop computer, a touchscreen for a mobile device (e.g., a phone or tablet), or other types of devices capable of outputting digital graphics. In some implementations, display device 116 has a resolution that is different than the native resolution of the graphics being displayed, and the graphics are scaled or adjusted to fit the resolution of display device 116.

Memory 106 is used to store compressed vertex buffer data 102 generated by CPU 108 for transfer to GPU 110. Compressed vertex buffer data 102 includes an index buffer 102*a* and compressed vertex buffer 102*b*. Index buffer 102*a* includes an index for each vertex of the tessellate triangles generated by CPU 108. Hence, index buffer 102*a* includes three indices for each tessellate triangle generated along a vector path. The indices in index buffer 102*a* points to vertex attributes in compressed vertex buffer 102*b*. Compressed vertex buffer 102*b* includes a vertex buffer entry for each unique vertex of the vector path. For example, a vertex that is shared by two triangles is represented by two indices in index buffer 102*a*, but is represented by only one vertex buffer entry in compressed vertex buffer 102*b*. In other words, both indices in index buffer 102*a* point to the same vertex buffer entry in compressed vertex buffer 102*b*. Each vertex buffer entry in compressed vertex buffer 102*b* includes vertex attributes for a vertex. The vertex attributes include the position of the vertex as well as visual characteristics such as color, stroke width, and anti-aliasing information such as anti-aliasing directions (e.g., clockwise or anti-clockwise, concave side or convex side). In some embodiments, an anti-aliasing direction is a direction in which a rendering process anti-aliases a portion of a vector graphic. When performing resolution-independent rendering of a vector graphic, a graphics processing unit utilizes anti-aliasing to reduce or prevent visibly jagged lines between regions of color transition. Thus, with respect to a curved line, an anti-aliasing direction includes any of convex-side anti-aliasing, concave-side anti-aliasing, clockwise-side anti-aliasing, or anticlockwise-side anti-aliasing associated with a vector path.

A number of draw calls to vertex shader 118 are issued based on the number of indices corresponding to vertices in index buffer 102*a*. For example, two draw calls are issued for each index in the index buffer. Vertex shader 118 then generates rendering parameters for the vertices based on the vertex attributes stored in compressed vertex buffer 102*b*, and fragment shader 120 rasterizes the vector graphic on display 116 based on the rendering parameters. To achieve resolution-independent rendering of vector graphics, anti-aliasing is applied to portions of the vector graphic based on the properties of the vector paths to remove a jagged appearance between transition areas of a vector graphic. This is done, for example, by averaging colors of pixels at the boundaries of color transitions. Accordingly, the compressed vertex buffer allows two-dimensional vector graphics to be rendered at various resolution while removing visual distortions along the vector paths.

Figure 2:
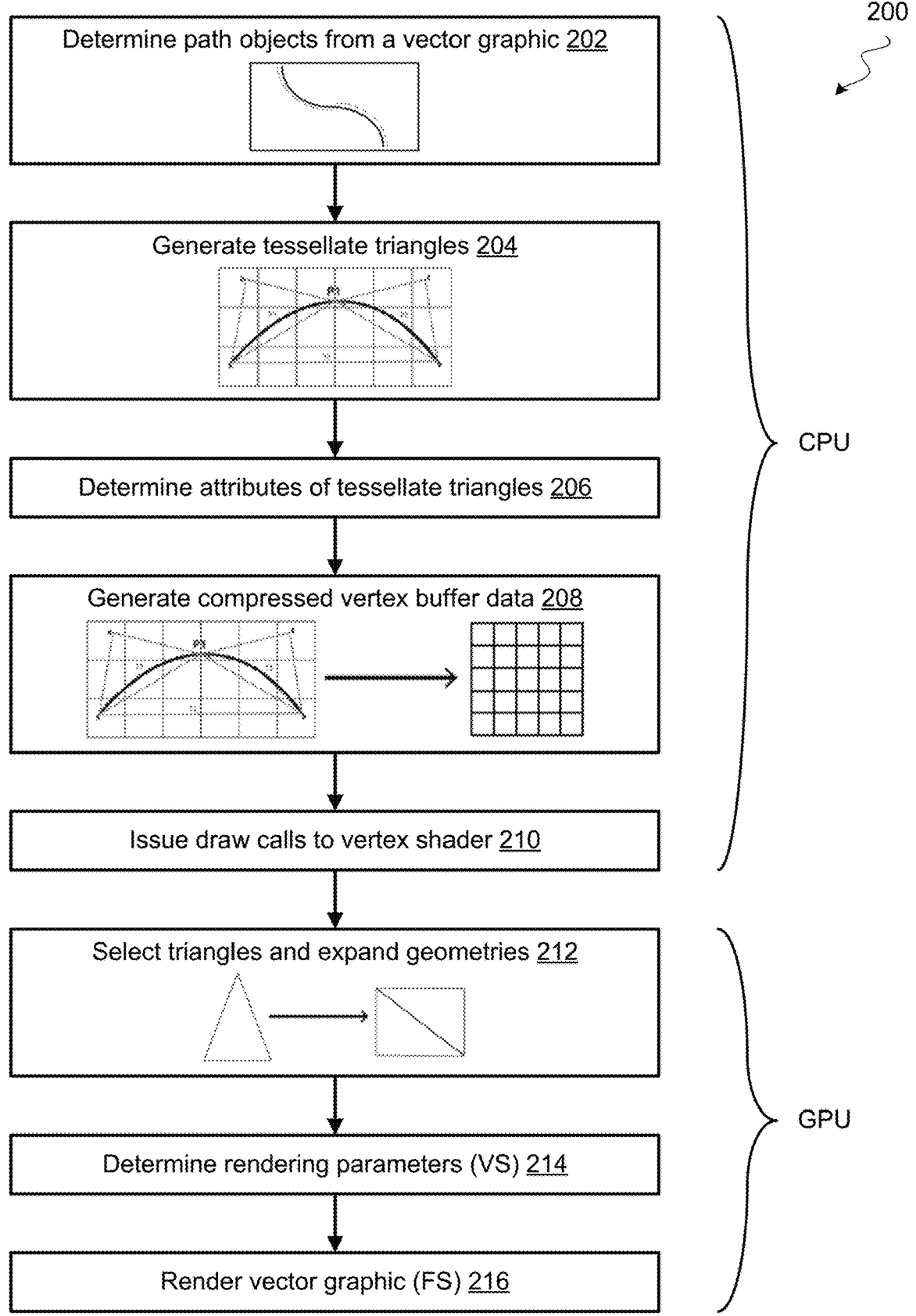
FIG. 2 illustrates a flow diagram of an example of a process for rendering a vector graphic using a compressed vertex buffer, in accordance with some implementations.

FIG. 2 illustrates an example of a process 200 for rendering a vector graphic using a compressed vertex buffer. Process flow 200 includes a first set of operations that are performed by a CPU to process and prepare data (e.g., compressed vertex buffer data) associated with a vector graphic, and a second set of operations performed by a GPU rendering pipeline to render the vector graphic on a display device. More specifically, operations at blocks 202 to 210 are performed by a CPU, and operations at blocks 212 to 216 are performed by a GPU. Having a large amount of data to transfer between the CPU and GPU can create a bottleneck for the rendering pipeline. As such, reducing the amount of data being transferred from the CPU to the GPU improves system performance by reducing processing latency and improving memory storage efficiency.

Process 200 begins at block 202 by determining path objects from a vector graphic. Image data for the vector graphic are analyzed to identify one or more vector paths in the vector graphic. Additionally, the vector paths are segmented into two-dimensional path objects to individually identify objects bounded by lines and curves. For instance, a segmentation algorithm is utilized to split cubic Bezier curves into monotonic quadratic Bezier segments. Additional details of the segmentation operations are described with reference to FIG. 3A below.

At block 204, the vector path objects are tessellated by converting portions of the vector path objects into tessellate triangles. For example, a tessellation algorithm is utilized to generate tessellate triangles that represent the monotonic quadratic Bezier segments obtained from the vector graphic based on segmented curved paths of the identified path objects. Tessellating the vector path objects of the vector graphic allows image data associated with the vector graphic to be prepared for processing by a GPU. Additional details of the tessellation operations are described with reference to FIGS. 3B-C below.

At block 206, attributes of the tessellate triangles in the tessellated geometry are determined. For example, visual attributes that affect rendering of the vector paths corresponding to the triangles are determined. Such attributes include a color of the vector path object determined from the image data. Classifiers associated with the tesselate triangles that indicate the primitive type of the path objects and anti-aliasing directions are also determined. The primitive type can be, for example, an interior triangle, an exterior triangle with convex/concave anti-aliasing, or a line with anti-clockwise/clockwise side anti-aliasing, etc. Furthermore, classifiers indicating a stroke width for vector paths are also determined.

At block 208, compressed vertex buffer data is generated for the tessellated geometry. The compressed vertex buffer data includes an index buffer and a compressed vertex buffer. The index buffer includes a separate index entry for each vertex of each of the tessellate triangles. Hence, the index buffer includes three indices for each tessellate triangle. By way of example, a vector path segment that has three tessellate triangles (two exterior triangles and one interior triangle) will have nine indices in the index buffer. The compressed vertex buffer includes a vertex buffer entry for each unique vertex of the tessellated geometry. Thus, duplicate vertices or vertices that are shared by multiple tessellate triangles are not included in the compressed vertex buffer. This allows the storage size of the compressed vertex buffer to be reduced. Using the same example of a vector path segment tessellated with the three triangles, the compressed vertex buffer will have five entries corresponding to the unique vertices of the three triangles because four of the nine vertices of the three triangles are shared amongst the triangles. Each vertex buffer entry in compressed vertex buffer contains vertex attributes of the corresponding vertex such as the location of the vertex, color information, primitive type, and stroke width information.

At block 210, draw calls are issued to a vertex shader of the GPU. In some implementations, two draw calls are issued for each vertex or index in the index buffer. Hence, the total number of draw calls issued is twice the number of indices or vertexes in the index buffer. Following with the example above, for an index buffer with nine indices corresponding to nine vertices of three tessellate triangles, eighteen draw calls (twice the index count) will be issued to the vertex shader of the GPU.

The processing then transitions from the CPU to the GPU. By issuing two draw calls per vertex, representations of twice the number of tessellate triangles are created. This includes each of the original tessellate triangles as well as a replica of each of the tessellate triangles. Continuing with the example of the vector path segment having three tessellate triangles, the eighteen draw calls will create representations for six triangles from the three original tessellate triangles.

To perform anti-aliasing, geometry expansion is performed for the exterior tessellate triangles of the vector path, while no expansion is performed for the interior triangles. Accordingly, at block 212, a subset of the triangles created from the draw calls are selected for geometry expansion. After selecting the exterior triangles, expanded geometries are generated for the selected triangles. For example, a rectangle that encompasses a selected triangle in an anti-aliasing direction is generated for the corresponding vector path. The expanded geometry also includes an additional area beyond one or more vertices of the selected triangle in the anti-aliasing direction. Additional details of the geometry expansion operations are described below with reference to FIG. 3D below.

At block 214, rendering parameters for the vertices of the vector graphic are determined by the vertex shader (VS) of the GPU. The rendering parameters for a particular vertex include texture information and rendering location information (e.g., for rasterizing the vector graphic). In some implementations, the rendering parameters also include an indicator of whether a corresponding path object belongs to a line primitive or a degenerate primitive. For example, when the point coordinates of a triangle are transformed into the pixel space at a certain resolution, the three vertices may form a line at that resolution, or form a zero-area primitive at that resolution. Such information is included in the rendering parameters in some embodiments.

At block 216, the rendering parameters generated at block 214 are provided to a fragment shader (FS) to render the vector graphic on a display. For example, the fragment shader computes signed distance values of geometric fragments based on a rasterization of the vector graphic, modulates color values of the vector graphic, and performs anti-aliasing from the curve segments based on the computed signed distance values. Color values for rendering each pixel on a display device are then outputted based on the locations of path objects and anti-aliasing applied to the corresponding vector paths.

As described above, FIG. 2 illustrates an overview of a process 200 to prepare data for a two-dimensional vector graphic and using the data in a GPU rendering pipeline to render the two-dimensional vector graphic. FIGS. 3A-3D illustrate additional details of the process to preparing data to render a two-dimensional vector graphic, according to some embodiments.

Figure 3A:
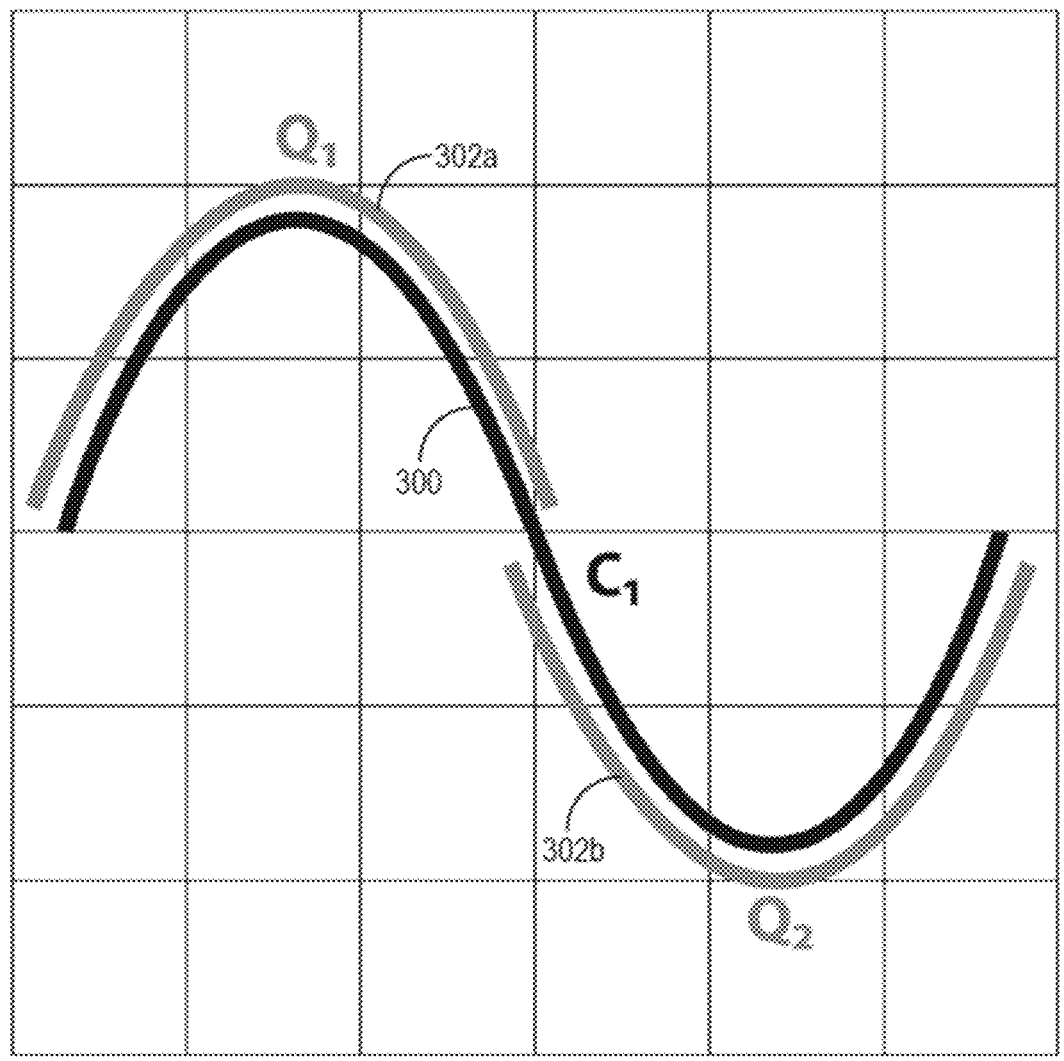
FIG. 3A illustrates an example of segmenting a vector graphic, in accordance with some implementations.

FIG. 3A illustrates an example of segmenting portions of the two-dimensional vector graphic into path objects. As shown in the example of FIG. 3, a cubic curve 300 of a vector path is segmented into multiple separate path objects including distinct path segments. Specifically, the cubic curve 300 is segmented into a first monotonic quadratic Bezier segment 302a and a second monotonic quadratic Bezier segment 302b. Segmenting cubic curves of a curved vector path into multiple separate quadratic splines prepares the curved vector path for tessellation.

Figure 3B:
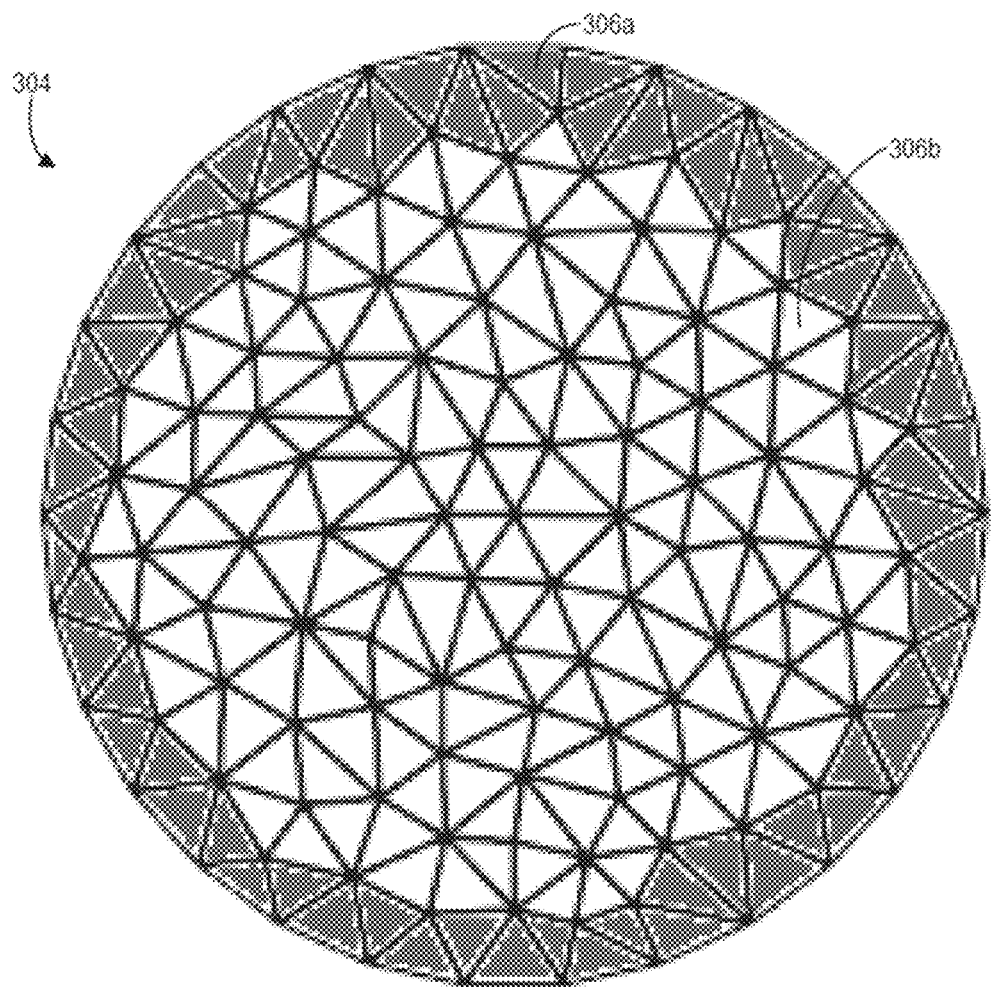
FIG. 3B illustrates an example of tessellating a vector graphic, in accordance with some implementations.

By segmenting the cubic curves into quadratic curves, a tessellation algorithm is able to triangulate the segments into triangles. For example, FIG. 3B illustrates a tessellated geometry 304 of a Bezier curve forming an ellipse. The Bezier curve is tessellated, for example, by first segmenting the Bezier curve into multiple separate path objects as described above with respect to FIG. 3A. A tessellation algorithm then tessellates the Bezier curve into exterior triangles and interior triangles based on whether each triangulated portion includes a portion of a vector path. In some implementations, a polygon clipping algorithm such as a Vatti clipping algorithm is used to generate the tessellated geometry 304 by producing interior triangles for path objects located in the interior of the vector path (e.g., inside the ellipse) and exterior triangles located along the vector path (e.g., along the exterior of the ellipse). Referring to FIG. 3B, the exterior polygons (e.g., exterior triangle 306a) are shaded, and the interior polygons (e.g., interior triangle 306b) are not shaded. Although the example in FIG. 3B utilizes the Vatti algorithm to generate the tessellated geometry 304, other tessellation algorithms for triangulating two-dimensional geometries are also compatible with the techniques disclosed herein.

Figure 3C:
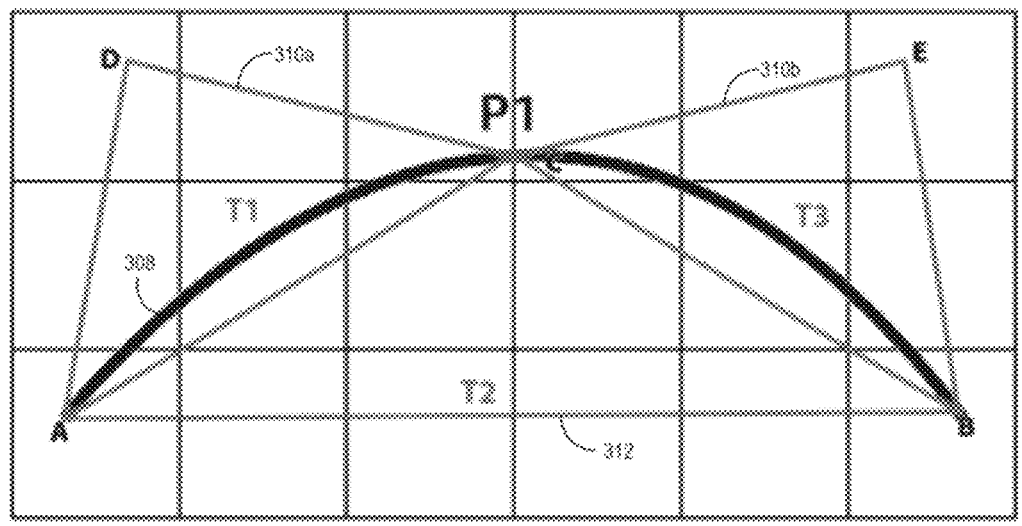
FIG. 3C illustrates an example of tessellate triangles along a vector path, in accordance with some implementations.

FIG. 3C illustrates a more detailed example of a tessellated geometry for a two-dimensional vector graphic. As shown, a vector path 308 including a curve segment is processed to triangulate the vector path according to a tessellation algorithm. For example, the curve segment of the vector path 308 is a quadratic Bezier curve. When tessellating the vector path 308, a first exterior triangle 310a, a second exterior triangle 310b, and an interior triangle 312 are generated to represent different portions of the vector path. The generated triangles are referred to as tessellate triangles. The first exterior triangle 310a includes a first portion of the vector path 308 and the second exterior triangle 310b includes a second portion of the vector path 308. In contrast, the interior triangle 312 does not include any portion of the vector path 308. In some implementations, a tessellation algorithm that ensures no overlap of triangles in the tessellated geometry is used. In other implementations, a tessellation algorithm that allows overlap of triangles in the tessellated geometry is used.

Figure 3D:
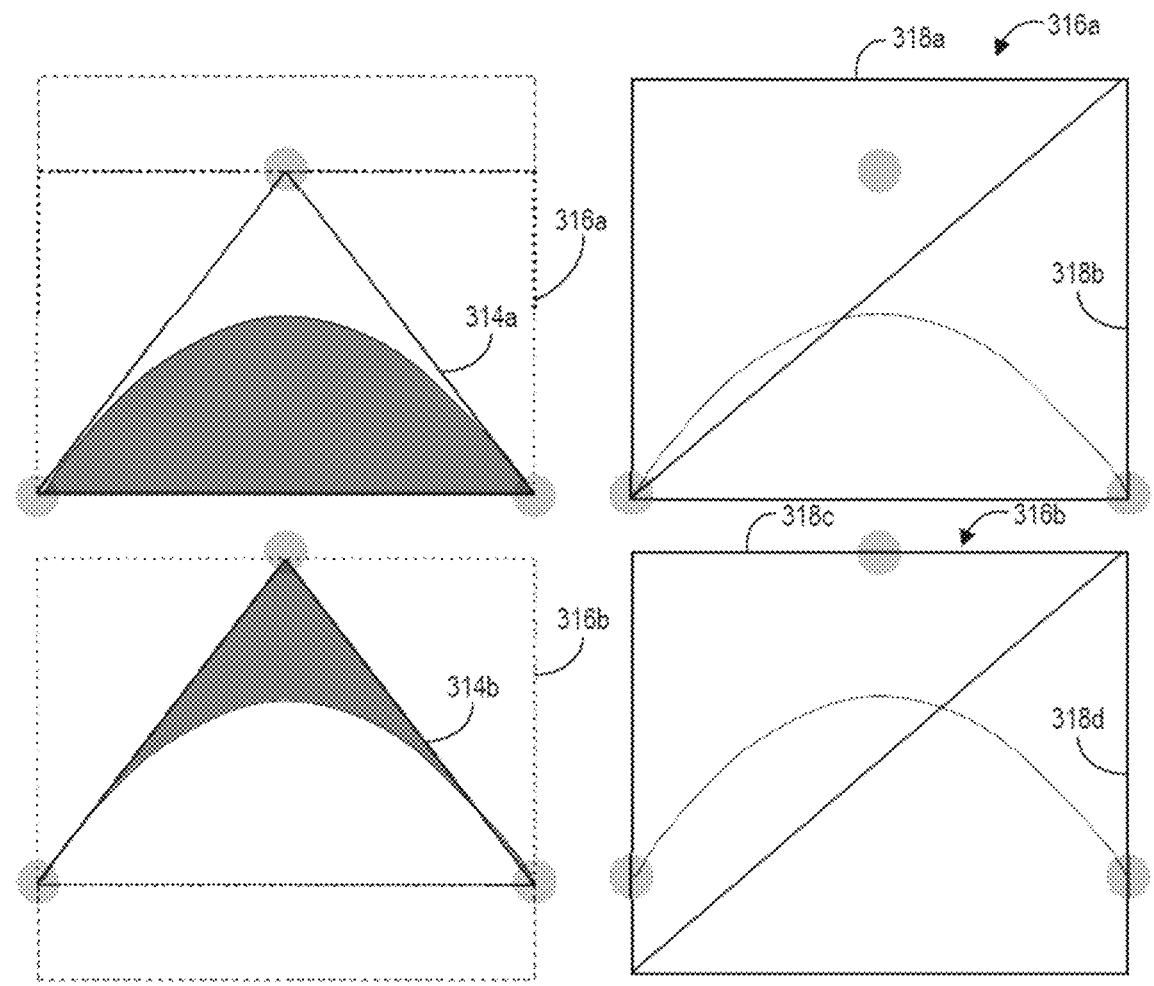
FIG. 3D illustrates an example of geometry expansion, in accordance with some implementations.

After tessellating one or more vector paths of a vector graphic into the tessellate triangles, the geometries of exterior triangles are expanded by applying anti-aliasing to the corresponding portions of the vector graphic in the GPU rendering pipeline. FIG. 3D includes a series of diagrams to illustrate expanded geometries for exterior triangles based on anti-aliasing directions of the corresponding vector paths. In particular, FIG. 3D illustrates expanded geometries based on anti-aliasing directions on different sides of vector paths according to color transitions in the corresponding path objects.

As shown in FIG. 3D, for example, a first exterior triangle 314a corresponds to a vector path with a concave-side fill. Accordingly, the vector path is determined to have convex-side anti-aliasing (outside the curve of the vector path). Because the vector path has convex-side anti-aliasing, a first expanded geometry 316a (e.g., a rectangle) that encompasses the first exterior triangle 314a is generated. Additionally, the first expanded geometry 316a is generated to include an additional area that extends beyond (e.g., above) the first exterior triangle 314a in the anti-alias direction. By including the additional area within the first expanded geometry 316a, additional space is provided for rendering the vector path with anti-aliasing in the convex-side anti-aliasing direction.

FIG. 3D also illustrates a second exterior triangle 314*b* corresponding to a vector path with a convex-side fill. Accordingly, the vector path is determined to have a concave-side anti-aliasing (inside the curve of the vector path). Because the vector path has concave-side anti-aliasing, a second expanded geometry 316*b* is generated that encompasses the second exterior triangle 314*b* and also includes an additional area that extends beyond (e.g., below) the second exterior triangle 314*b* in the anti-alias direction. Thus, the second expanded geometry 316*b* includes additional space below the second exterior triangle 314*b* for rendering the vector path with anti-aliasing in the concave-side anti-aliasing direction.

In some implementations, it is possible for a vector path to have lines/curves with anti-aliasing in both the concave-side direction and the convex-side direction. For example, for a vector path that includes a curve/line with a stroke with no fill to either side of the vector path, the vector path is determined to have anti-aliasing directions in both the convex and concave sides of the vector path. An expanded geometry for such a vector path is generated that encompasses the corresponding exterior triangle and expands beyond the exterior triangle in both anti-aliasing directions (e.g., above and below the exterior triangle) for rendering the vector path with anti-aliasing in both directions.

To generate an expanded geometry for an exterior triangle, an exterior triangle is first replicated. The vertex locations of the exterior triangle and the replicate triangle are modified to create the expanded geometry with four vertex locations (e.g., the triangles share two vertices). More specifically, the vertex locations of a triangle are modified by multiplying vertex locations by a transformation matrix dependent on a current resolution (e.g., zoom level) at which the GPU is rendering the path objects. A geometry expansion algorithm is then applied to the transformed vertex locations. Additionally, the new vertex locations after geometry expansion are determined by converting the vertex locations of the expanded geometry to the original coordinate space by multiplying the vertex locations with the inverse of the transformation matrix.

As shown in FIG. 3D, the first expanded geometry 316*a* includes triangles 318*a* and 318*b*, and the second expanded geometry 316*b* includes triangles 318*c* and 318*d*. FIG. 3D also illustrates that each of the expanded geometries encompasses the original vertices of the corresponding exterior triangles within an area of the expanded geometries. In some embodiments, the expanded geometries do not include one or more of the original vertices as vertex locations for the new triangles, depending on the anti-aliasing direction(s).

Figure 4:
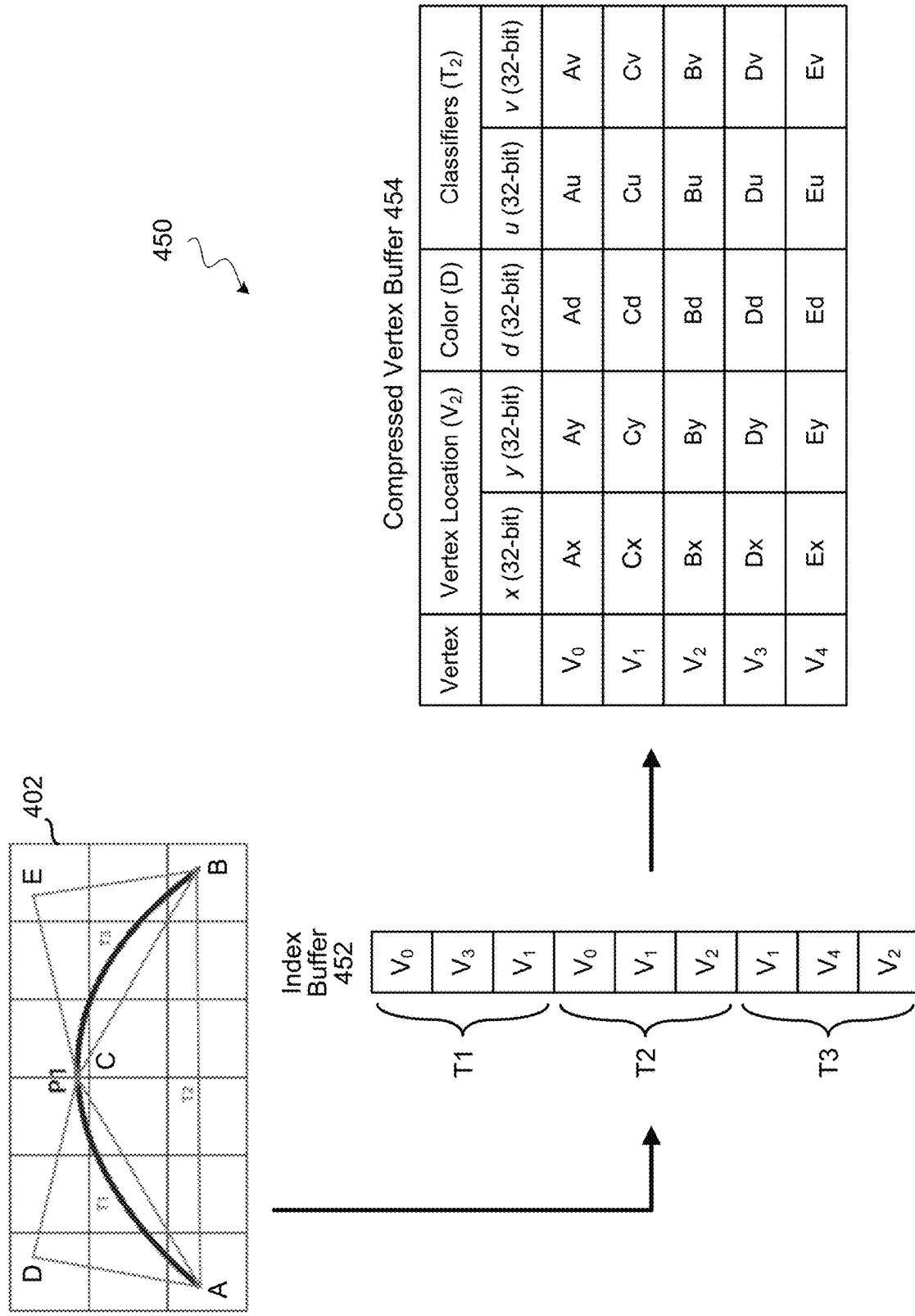
FIG. 4 illustrates a conceptual diagram of an example of compressed vertex data generated for a vector path, in accordance with some implementations.

FIG. 4 illustrates an example of compressed vertex buffer data 400 that a CPU prepares for the GPU to perform anti-aliasing, according to some implementations. FIG. 4 shows a tessellated geometry 402 for a two-dimensional vector graphic that includes three tessellate triangles T1, T2, and T3 generated for a curved vector path P1. Triangle T1 is defined by three vertices A, D, and C; triangle T2 is defined by vertices A, C, and B; and triangle T3 is defined by vertices C, E, and B. Triangles T1 and T3 are considered exterior triangles, because these triangles encompass the curve segments of the vector path P1. In other words, the curve segments that make up vector path P1 are within the triangles T1 and T3. Triangle T2 is considered an interior triangle, because the curve segments of vector path P1 are not inside triangle T2.

After tessellating the vector path P1 with the tessellate triangles T1, T2, and T3, the CPU of a computing system generates an index buffer 452 to represent the tessellate triangles. As shown in FIG. 4, index buffer 452 includes an index entry for each vertex of each tessellate triangle. Hence, because the tessellated geometry 402 in the example of FIG. 4 has three tessellate triangles, index buffer 452 has nine index entries including three index entries for each of tessellate triangles T1, T2, and T3. Referring to index buffer 452, tessellate triangle T1 is represented by indices $V_0$, $V_3$, and $V_1$, which corresponds to vertices A, D, and C, respectively; tessellate triangle T2 is represented by indices $V_0$, $V_1$, and $V_2$, which corresponds to vertices A, C, and B, respectively; and tessellate triangle T3 is represented by indices $V_1$, $V_4$, and $V_2$, which corresponds to vertices C, E, and B, respectively. A vertex that is shared by multiple tessellate triangles has separate index entries in index buffer 452 for each tessellate triangle, but the index value in those index entries is the same for the same vertex. For example, vertex A is shared by tessellate triangle T1 and T2, and hence there are two separate index entries with the same index value $V_0$ representing vertex A in index buffer 452. The number of tessellate triangles in the tessellated geometry is determined as the index count of the index buffer divided by three. Given index buffer 452 has nine index entries, index buffer 452 represents a tessellated geometry 402 with three tessellate triangles.

In addition to generating index buffer 452, the CPU also generates compresses vertex buffer 454. Each unique index value in index buffer 452 corresponds to a vertex buffer entry in compressed vertex buffer 454. In some implementations, the index value can be a pointer or a reference to the corresponding vertex buffer entry in compressed vertex buffer 454. For example, the index value can be a lookup key, a memory address, or a row number, etc. that can be used to retrieve the corresponding vertex buffer entry.

Each vertex buffer entry in compressed vertex buffer 454 represents a unique vertex in the tessellated geometry. Thus, while a vertex that is shared by multiple tessellate triangles has separate index entries in index buffer 452, such a vertex has only a single vertex buffer entry in compressed vertex buffer 454. In this manner, duplicate vertices in the tessellate geometry are excluded when generating compressed vertex buffer 454, and there are multiple index entries in index buffer 452 that point to the same vertex buffer entry in compressed vertex buffer 454.

Each vertex buffer entry includes vertex attributes such as location, color, and classifier information for the corresponding vertex. For example, referring to compressed vertex buffer 454, a vertex buffer entry in the example shown includes a two-dimensional set of coordinates ($V_2$) indicating a location of the corresponding vertex (e.g., a 32-bit x-coordinate and a 32-bit y-coordinate), a one-dimensional color value (D) representing a color of the vector path (e.g., a 32-bit color value d), and a two-dimensional set of classifiers ($T_2$) (e.g., a 32-bit rendering primitive classifier u and a 32-bit stroke width classifier v). Hence, each vertex buffer entry has a $V_2DT_2$ data structure in compressed vertex buffer 454. It should be understood that it is possible for other implementations to use a different number of bits to represent any of the vertex attributes, and that different vertex attributes can be represented using different number of bits.

The location of a vertex refers to a location within a coordinate system that a GPU utilizes to render on a display device. For example, in a coordinate system that includes an x-axis and a y-axis, the vertex location has a format determined as coordinates (x, y). The color of the vertex is determined based on a color of the corresponding vector path or path object. For instance, in some implementations, the color of the vector path is assigned to the vertices of the corresponding triangles along the vector path, and a fill color is assigned to vertices of interior triangles. The rendering primitive classifier refers to the primitive type and anti-aliasing direction for the corresponding vector path or portion of the vector graphic. For example, the rendering primitive classifier indicates the corresponding vertex as one of an interior triangle, an exterior triangle with convex side anti-aliasing, an exterior triangle with concave side anti-aliasing, a line with anti-clockwise side anti-aliasing, or a line with clockwise side anti-aliasing, etc. The stroke width classifier refers to the stroke width of the segments of the vector path. In some embodiments, a null value or zero value is assigned to vertices of triangles corresponding to portions of the vector graphic that do not include a stroke (e.g., interior triangles or non-line primitive types).

By way of example, vertex A represented by $V_0$ has a vertex buffer entry that includes the coordinates Ax and Ay, color Ad, rendering primitive classifier Au, and stroke width classifier Av. Vertex C represented by $V_1$ has a vertex buffer entry that includes the coordinates Cx and Cy, color Cd, rendering primitive classifier Cu, and stroke width classifier Cv. Vertex B represented by $V_2$ has a vertex buffer entry that includes the coordinates Bx and By, color Bd, rendering primitive classifier Bu, and stroke width classifier By. Vertex D represented by $V_3$ has a vertex buffer entry that includes the coordinates Dx and Dy, color Dd, rendering primitive classifier Du, and stroke width classifier Dv. Vertex E represented by $V_4$ has a vertex buffer entry that includes the coordinates Ex and Ey, color Ed, rendering primitive classifier Eu, and stroke width classifier Ev.

In some implementations, the vertex locations for the tessellated geometry in the index buffer are mapped according to a vertex rendering order associated with the tessellate triangles. For example, the vertex locations for a first tessellate triangle T1 in the index buffer 452 are grouped together in an order (e.g., $V_0$, $V_3$, and $V_1$) in which the draw calls are issued to a vertex shader in the GPU rendering pipeline; the vertex locations for a first tessellate triangle T2 in the index buffer 452 are grouped together in an order (e.g., $V_0$, $V_1$, and $V_2$) in which the draw calls are issued to a vertex shader in the GPU rendering pipeline; and the vertex locations for a third tessellate triangle T3 in the index buffer 452 are grouped together in an order (e.g., $V_1$, $V_4$, and $V_2$) in which the draw calls are issued to a vertex shader in the GPU rendering pipeline.

Storing the vertex data for tessellated geometry of a vector graphic in the compressed vertex buffer 454 reduces the storage requirements and amount of data transferred between a CPU and a GPU at render time. To invoke the GPU to render the vector graphic on a display device, the CPU issues a number of draw calls to the vertex shader of the GPU. The number of draw calls is based on the number indices in index buffer 454. For example, in some implementations, the number of draw calls is twice the index count of index buffer 454. In other words, two draw calls are issued for each index corresponding to a vertex in index buffer 454. This allows the GPU to generate a replica triangle for each of the tessellate triangle in index buffer 454. As explained above, the replica triangles for exterior triangles are used for geometry expansion to perform anti-aliasing.

Figure 5:
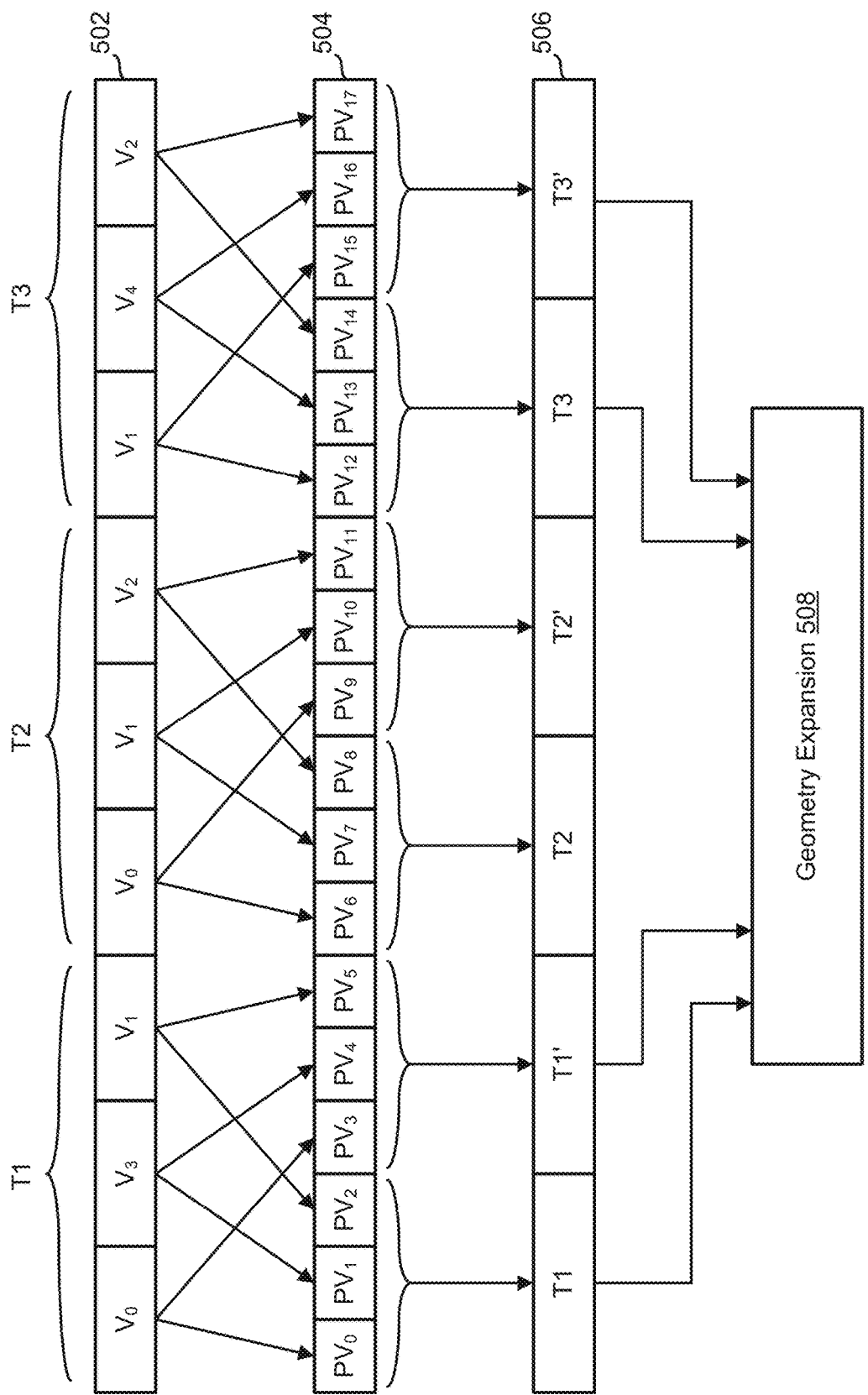
FIG. 5 illustrates a conceptual diagram of an example of processing vertices of a vector path, in accordance with some implementations.

FIG. 5 illustrates a conceptual diagram of mapping draw calls to triangles for geometry expansion processing by the GPU. The example shown in FIG. 5 corresponds to the compressed vertex data 450 for the tessellated geometry 402 of FIG. 4. Index buffer 452 form FIG. 4 is reproduced as index buffer 502 in FIG. 5. As mentioned above, two draw calls are issued for each index in index buffer 502. Hence, eighteen draw calls are issued for the nine indices in index buffer 502.

Each draw call maps to one of the pseudo vertices 504 represented as $PV_i$, where i is the vertex identifier $V_{id}$. The draw calls are issued in an order that repeats each tessellate triangle. Thus, the first three draw calls correspond to indices $V_0$, $V_3$, and $V_1$ of the first tessellate triangle T1, which map to pseudo vertices $PV_0$, $PV_1$, and $PV_2$; and the next three draw calls correspond to the same set of indices $V_0$, $V_3$, and $V_1$ for the replica of the first tessellate triangle T1, which map to pseudo vertices $PV_3$, $PV_4$, and $PV_5$. Similarly, the next three draw calls correspond to indices $V_0$, $V_1$, and $V_2$ of the second tessellate triangle T2, which map to pseudo vertices $PV_6$, $PV_7$, and $PV_8$; and the following three draw calls correspond to the same set of indices $V_0$, $V_1$, and $V_2$ for the replica of the second tessellate triangle T2, which map to pseudo vertices $PV_9$, $PV_{10}$, and $PV_{11}$. The next three draw calls correspond to indices $V_1$, $V_4$, and $V_2$ of the third tessellate triangle T3, which map to pseudo vertices $PV_{12}$, $PV_{13}$, and $PV_{14}$; and the following three draw calls correspond to the same set of indices $V_1$, $V_4$, and $V_2$ for the replica of the third tessellate triangle T3, which map to pseudo vertices $PV_{15}$, $PV_{16}$, and $PV_{17}$.

The triangle identifier $T_{id}$ for which the vertex shader is invoked can be determined as $T_{id}=(V_{id}/3)$. Hence, the draw calls in FIG. 5 will result in six mapped triangles 506 having $T_{id}$'s from 0 to 5. The six mapped triangles 506 are represented as T1, T1', T2, T2', T3, and T3', where T1, T2, and T3 are the original tessellate triangles, and T1', T2', and T3' are the corresponding replica triangles. The process triangle identifier $PT_{id}$, which indicates the actual tessellate triangle being processes is determined as $PT_{id}=(T_{id}/2)$. Based on the $V_{id}$ and $PT_{id}$, the index identifier $I_{id}$ of the index entry in index buffer 502 for the draw call is determined as $I_{id}=(PT_{id}*3)+(V_{id}\%3)$. The true vertex identifier $TV_{id}$, which is used to lookup the vertex attribute in the compressed vertex buffer, is determined as $TV_{id}=IndexBuffer[I_{id}]$. To distinguish between the tessellate triangle and the replica, each triangle has an instance identifier $Inst_{id}=(T_{id}\%2)$. Hence, each tessellate triangle has two instances corresponding to the original tessellate triangle and the replica of tessellate triangle, as identified by $Inst_{id}$.

As discussed above, geometry expansion is performed for exterior triangles, but not for interior triangles. In some implementations, the identifiers described above are used by the vertex shader to determine which triangles are selected for the geometry expansion processing 508. For example, based on the order of indices in the index buffer, a $PT_{id}$ of 1 indicates the vertex being processed is part of the interior triangle T2. As such, the vertex shader makes a determination to not perform geometry expansion when $PT_{id}=1$ such that interior triangle T2 is excluded from the geometry expansion processing 508. In some embodiments, the vertex shader references the rendering primitive classifier in the compressed vertex buffer to determine whether a vertex belongs to an interior or exterior triangle. According to some implementations, the vertex shader can set a large invalid value for the vertices of triangles that are excluded from geometry expansion, such that the vertices are discarded by the fragment shader downstream in the rendering pipeline.

As draw calls are issued to the vertex shader, the vertex shader generates rendering parameters including an anti-aliasing spread based on the triangles. For example, texture coordinates are computed for an input triangle for the convexity of the corresponding curve (e.g., quadratic Bezier curve). For triangles that are subject to geometry expansion, the vertex shader generates barycentric coordinates at new vertex locations after generating expanded geometries for the exterior triangles. Because the new vertex locations are different than the original vertex locations due to the expanded geometries, new values of the texture coordinates are also computed using barycentric interpolation in two-dimensional space.

In some implementations, the vertex shader determines whether each vertex belongs to one of several primitive types. For instance, the vertex shader determines whether each vertex belongs to a line primitive. When point coordinates of a triangle are transformed to the pixel space, a determination is made if the three vertices for the triangle form a line at a certain resolution. In response to determining that the three vertices form a line at a certain resolution, the vertex shader determines that each of the vertices belongs to a line primitive at the identified resolution.

As another example, the vertex shader determines whether each vertex belongs to a degenerate primitive. When point coordinates of a triangle are transformed to the pixel space, a determination is made if the three vertices for the triangle form a zero-area primitive at a certain resolution. In response to determining that the three vertices form a zero-area primitive at a certain resolution, the vertex shader determines that each of the vertices belongs to a degenerate primitive at the identified resolution.

After the vertex shader generates the rendering parameters, the rendering parameters are passed to a fragment shader in the GPU rendering pipeline to determine color values for rendering on a display device. For example, the fragment shader generates a rendered graphic by computing signed distance values of curve fragments based on a rasterization of the vector graphic. The color values of the vector graphic are modulated, and anti-aliasing is performed based on the computed signed distance values to display the rendered graphic on a display device. For example, in some implementations, the fragment shader performs alpha modulation and uses a gradient function to compute an alpha value for anti-aliasing to reduce the distortion artifacts when representing the curve at resolutions lower than a native resolution.

Figure 6:
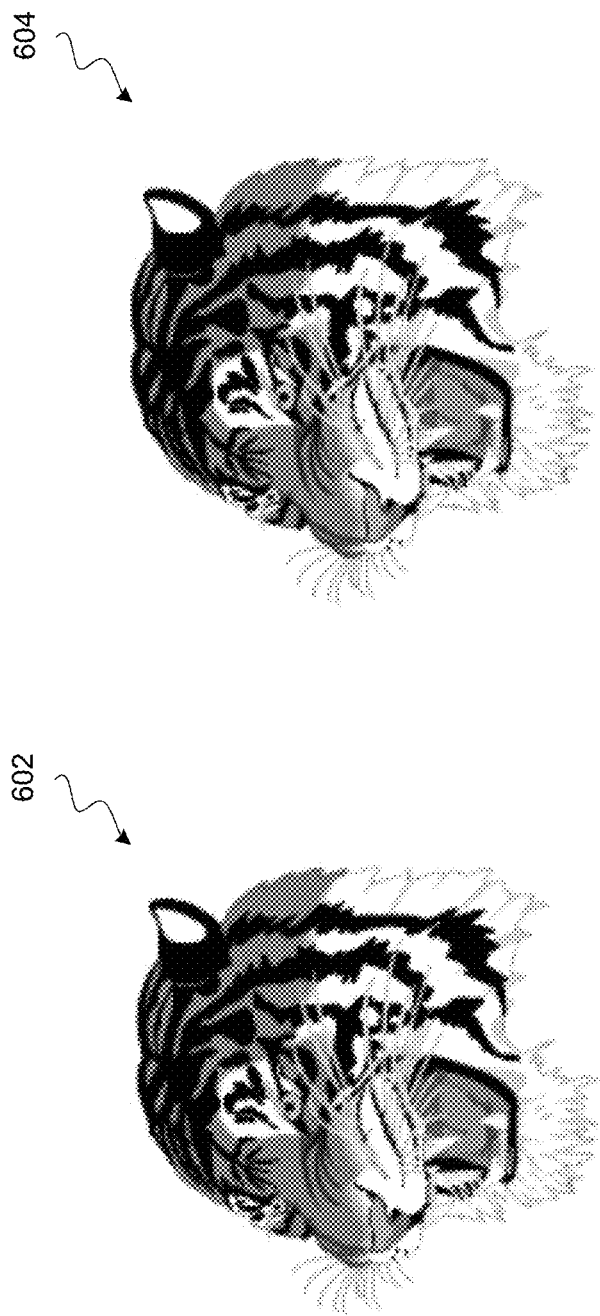
FIG. 6 illustrates example renderings of a two-dimension vector graphic, in accordance with some implementations.

FIG. 6 illustrate a comparison of an example of two-dimensional vector graphics being rendered when using a multi-vertex buffer system as compared to the compressed vertex buffer techniques disclosed herein. Specifically, vector graphic 602 is rendered utilizing a multi-vertex buffer system that stores vertex attributed for every vertex of the tessellate triangles and replica of exterior triangles. Vector graphic 604 is rendered utilizing the compressed vertex buffer techniques disclosed herein. As shown, the compressed vertex buffer techniques produce a rendered graphic with comparable accuracy to the multi-vertex buffer system.

Additionally, by utilizing the compressed vertex buffer to render two-dimensional vector graphics, improved performance is achieved relative to a conventional system that utilizes a geometric shader ("OpenGL") as well as the multi-vertex buffer system. As shown in Table 1 below, the compressed vertex buffer techniques disclosed herein produce comparable rendering quality while significantly improving benchmark performance when rendering a various different vector graphics. In the table below, a lower benchmark value indicates better performance.

TABLE 1

Comparative Performance Data

| Image | Open GL | Multi-Vertex | Compressed Vertex | Gain over OpenGL | Gain over Multi-Vertex |
|---|---|---|---|---|---|
| Graphic 1 | 61 | 50 | 33 | 1.848 | 1.515 |
| Graphic 2 | 32 | 22 | 19 | 1.684 | 1.158 |
| Graphic 3 | 50 | 35 | 29 | 1.724 | 1.207 |
| Graphic 4 | 223 | 193 | 138 | 1.616 | 1.399 |
| Graphic 5 | 245 | 116 | 83 | 2.952 | 1.398 |
| Graphic 6 | 49 | 75 | 34 | 1.441 | 2.206 |

As these performance gains demonstrate, the compressed buffer system provides better performance without using a geometry shader while reducing the memory storage requirements and the amount of data being transferred from the CPU to the GPU. The reduction in memory storage requirements also allows the techniques to be used in web applications and mobile devices where memory capacity can be limited.

Figure 7:
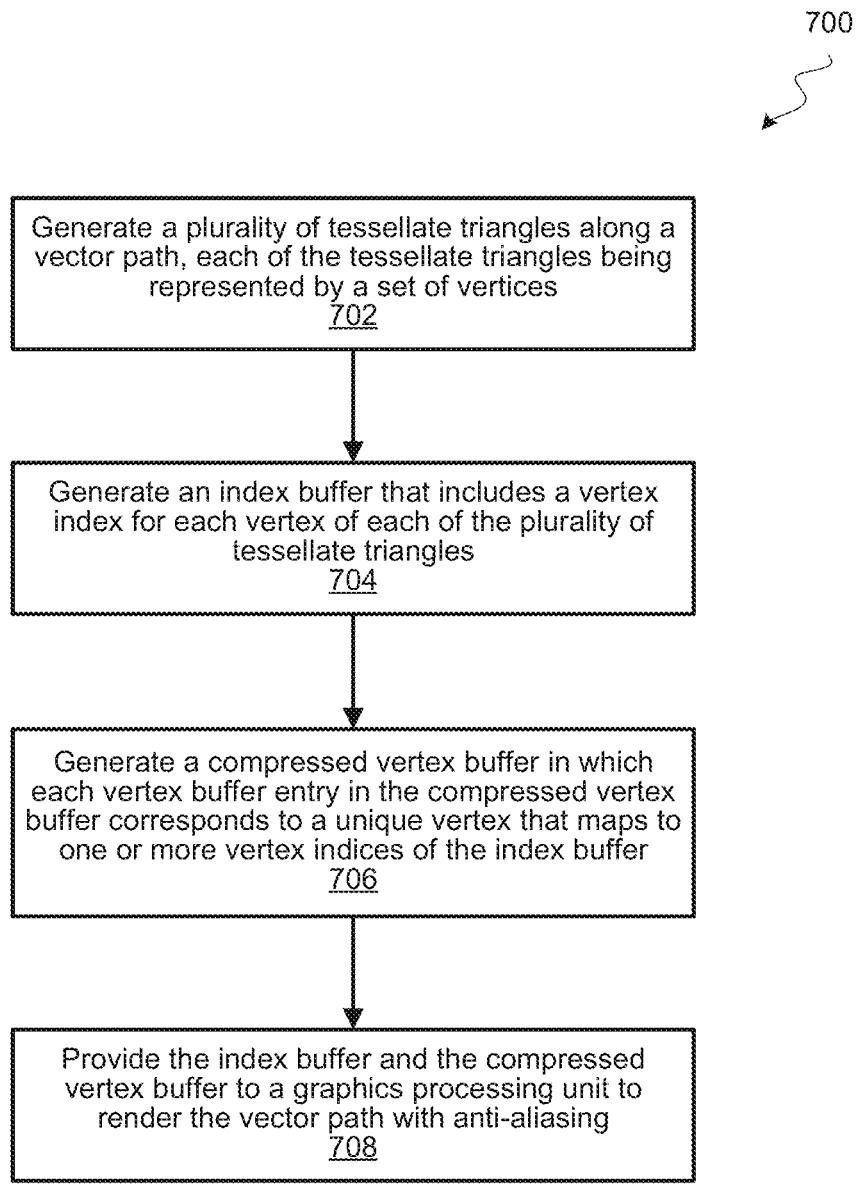
FIG. 7 illustrates a flow diagram of an example of a process that is performed as part of a vector graphic anti-aliasing technique, in accordance with some implementations.

FIG. 7 illustrates a flow diagram of an example of a process 700 that is performed as part of a vector graphic anti-aliasing technique. Process 700 is performed, for example, by a CPU (e.g., one or more processors) of a computing system to prepare data for a GPU to perform anti-aliasing. As compared to other techniques, process 700 reduces the amount of data used to convey vertex information of a tessellated geometry to the GPU. This translates to both a more efficient use of the computing system's memory as well as a reduction in the memory access latency for the GPU to obtain the vertex information. In some embodiments, process 700 is implemented as instructions stored on a non-transitory computer readable medium executable by one or more processors of the computing system.

At block 702, a set of tessellate triangles are generated along a vector path. For example, a vector path is segmented into multiple separate path objects such as quadratic Bezier curve segments. A polygon clipping algorithm such as a Vatti clipping algorithm is used to generate tessellate triangles. The tessellate triangles include interior triangles for path objects located in the interior of the vector path, and exterior triangles located along the vector path. In some implementations, a vector path is tessellated into, for example, hundreds or thousands of tessellate triangles. Each of the tessellate triangles is represented by a set of three vertices, and some tessellate triangles share one or more vertices (have one or more common vertices).

At block 704, an index buffer that includes a vertex index for each vertex of each of the tessellate triangles is generated. Each vertex index (or simply referred to as an index) is stored in an index entry. Thus, the index buffer has three index entries storing three vertex indices, respectively, for each tessellate triangle. In other words, the number of indices in the index buffer or the index count is three times the number of tessellate triangles in the tessellated geometry. Each index maps to a vertex in the tessellated geometry, and multiple indices map to the same vertex when the vertex is shared by multiple tessellate triangles. In some embodiments, a vertex index is implemented as a pointer, reference, or address that is used to lookup or retrieve vertex attributes for the corresponding vertex.

At block 706, a compressed vertex buffer is generated. Each vertex buffer entry in the compressed vertex buffer corresponds to a unique vertex. In other words, duplicate vertices of the tessellate triangles in the tessellated geometry are excluded when generating the compressed vertex buffer.

For a vertex that is shared by multiple tessellate triangles, multiple index entries or vertex indices in the index buffer are mapped to the same vertex buffer entry. According to some embodiments, a vertex buffer entry includes a two-dimensional set of coordinates indicating a location of the corresponding vertex (e.g., x-coordinate and y-coordinate of the corresponding vertex), a one-dimensional color value representing a color of the vector path, and a two-dimensional set of classifiers. The set of classifiers includes a rendering primitive classifier and a stroke width classifier. The rendering primitive classifier indicates, for example, whether the vertex corresponds to an interior triangle, an exterior triangle with convex side anti-aliasing, an exterior triangle with concave side anti-aliasing, a line with anti-clockwise side anti-aliasing, or a line with clockwise side anti-aliasing, etc.

At block 708, the index buffer and the compressed vertex buffer are provided to a GPU to render the vector path with anti-aliasing. For example, a number of draw calls are issued to a vertex shader of the GPU to provide the index buffer and the compressed vertex buffer to the GPU. In some embodiments, the index buffer and/or the compressed vertex buffer are stored in a memory of the computing system accessible by the GPU, or copied to a local memory of the GPU. Each draw call provides a vertex index to the GPU to invoke the GPU to retrieve the vertex buffer entry mapped to the vertex index from the compressed vertex buffer stored in the memory. In some implementations, the number of draw calls being issued is equal to twice the number of vertex indices in the index buffer. In other words, two draw calls are issued for each vertex of the tessellated geometry.

Figure 8:
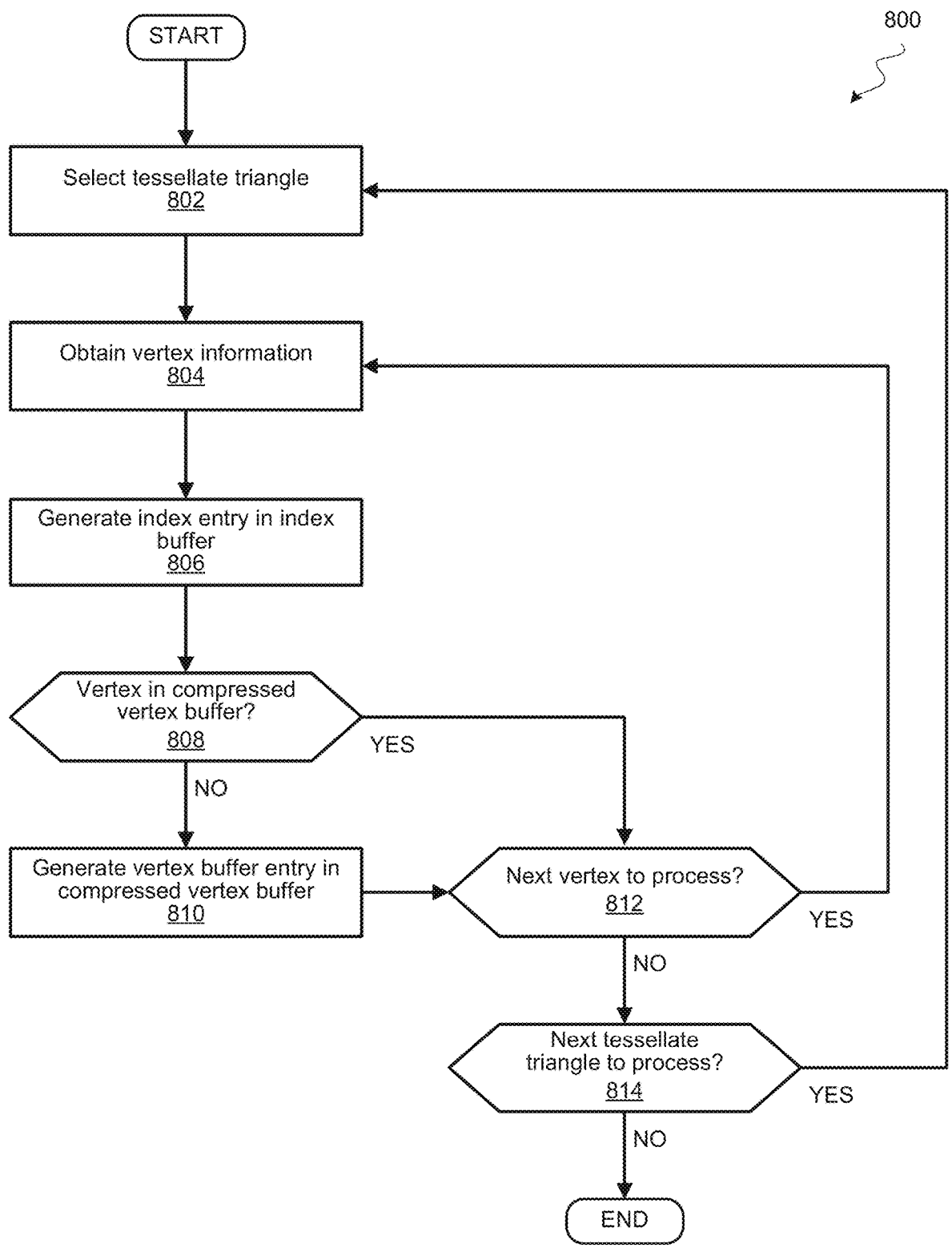
FIG. 8 illustrates a flow diagram of an example of a process for generating compressed vertex data, in accordance with some implementations.

FIG. 8 illustrates a flow diagram of an example of a process 800 for generating compressed vertex buffer data. In some embodiments, process 800 is used to implement blocks 704 and 706 of process 700 to generate the index buffer and the compressed vertex buffer. Process 800 is performed after a vector path has been tessellated, and is performed, for example, by a CPU to generate data for a GPU to process to render vector graphics.

Process 800 begins at block 802 by selecting a tessellate triangle along a vector path for processing. In some implementations, the tessellate triangle is selected based on a location of the tessellate triangle along the vector path, or based on the order in which the tessellate triangles were generated. In some implementations, a selection algorithm that selects interior and exterior triangles according to a certain sequence is utilized. For example, in some embodiments, the selection algorithm processes a vector path segment by selecting an exterior triangle that encompasses the vector path segment, followed by an interior triangle of the vector path segment, and then proceeds to the next vector path segment, and so on.

At block 804, vertex information of a vertex of the selected triangle is obtained from the tessellated geometry. The vertex information includes a location of the vertex. For example, in some embodiments, the location information is the (x, y) coordinates of the vertex. In some implementations, the vertex information also includes a color value, a primitive type, and a stroke width based on the characteristics of the vector path segment of the selected triangle.

At block 806, an index entry in the index buffer is generated for the vertex. The index entry is generated sequentially such that a new index entry follows the most-recently generated index entry. The index entry is used to store a vertex index for the vertex corresponding to the vertex information obtained at block 804. In some implementations, the vertex index is a vertex identifier generated by the tessellation algorithm. In some implementations, the vertex index acts as a pointer, reference, or address that maps to a vertex buffer entry in a compressed vertex buffer that stores vertex attributes.

At block 808, a determination is made as to whether the vertex being processed is already in the compressed vertex buffer. For example, in some implementations, the determination is made by checking whether the compressed vertex buffer has a vertex buffer entry with the same vertex index. In some implementations, the location of the vertex is compared with vertex location information of vertices in the compressed vertex buffer to determine if the vertex being processed is already in the compressed vertex buffer.

If the vertex being processed is not in the compressed vertex buffer, then at block 810, a new vertex buffer entry in the compressed vertex buffer is generated. The vertex buffer entry is used to store vertex attributes associated with the vertex. In some implementations, the vertex buffer entry has fields to store attributes including a location of the vertex, a color value, and classifiers such as a rendering primitive classifier and a stroke width classifier. The new vertex buffer entry is stored in the compressed vertex buffer in a manner that is accessible by the vertex index. For example, in some embodiments, the vertex buffer entry is stored in the compressed vertex buffer at an address that is derived from the vertex index.

If the vertex being processed is already in the compressed vertex buffer, then process 800 continues to block 812 from block 808. Process 800 also proceeds to block 812 from block 810 after generating a new vertex buffer entry. At block 812, a determination is made as to whether there is another vertex for the selected tessellate triangle to process. For example, if the number of vertices processed for the selected tessellate triangle is less than three, then the selected tessellate triangle has another vertex to process, and process 800 proceeds back to block 804 to obtain vertex information for the next vertex of the selected tessellate triangle.

If the number of vertices processed for the selected tessellate triangle is equal to three, then the selected tessellate triangle has no more vertices to process, and process 800 proceeds to block 814 to determine whether there is another tessellate triangle to process for the vector path. If the tessellated geometry has another tessellate triangle to process, then process 800 proceeds back to block 802 to select another tessellate triangle. If all tessellate triangles have been processed, then generation of the index buffer and the compressed vertex buffer is complete, and process 800 is terminated.

Figure 9:
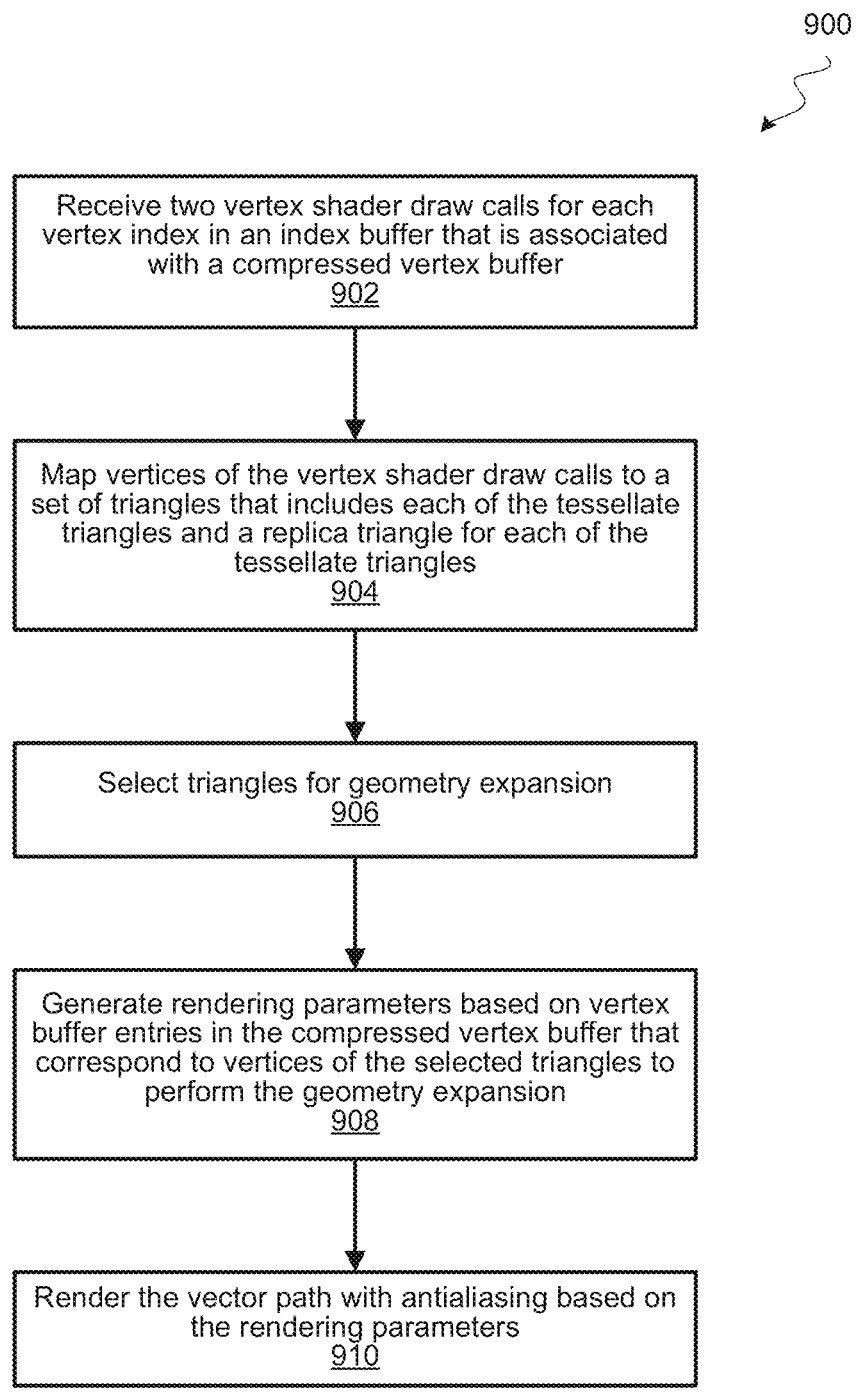
FIG. 9 illustrates a flow diagram of an example of another process that is performed as part of a vector graphic anti-aliasing technique, in accordance with some implementations.

FIG. 9 illustrates a flow diagram of an example of a process 900 that is performed as part of a vector graphic anti-aliasing technique. Process 900 is performed, for example, by a GPU (e.g., one or more graphics processors) of a computing system to render a vector path on a display device. In some implementations, the GPU includes a vertex shader and a fragment shader, and the GPU is configured to perform process 900 without using a geometry shader. In some embodiments, process 900 is implemented as instructions stored on a non-transitory computer readable medium executable by one or more graphics processors of the computing system.

At block 902, two vertex shader draw calls are received from a CPU for each vertex index in an index buffer to invoke the GPU to render a vector path. The index buffer includes a vertex index for each vertex of each of the tessellate triangles generated along the vector path of a tessellated geometry. Each vertex index maps to a vertex buffer entry in a compressed vertex buffer that stores vertex attributes. In some instances, multiple vertex indices map to the same vertex buffer entry (e.g., when two tessellate triangles share a common vertex). The compressed vertex buffer includes a vertex buffer entry for each unique vertex of the tessellate triangles of the vector path. Hence, the number of vertex buffer entries is less than the number of vertex indices in the index buffer, and each vertex buffer entry maps to one or more vertex indices of the index buffer. Each vertex buffer entry includes vertex attributes such as a location, color, a rendering primitive classifier, and a stroke width classifier for a corresponding vertex. In some embodiments, the index buffer and the compressed vertex buffer are generated, for example, by a CPU according to blocks 704 and 706, respectively, of process 700.

At bock 904, the vertices corresponding to the draw calls are mapped to a set of triangles. Because there are two draw calls for each vertex, the set of triangles being mapped at block 804 includes each of the tessellate triangles of the tessellated geometry and a replica triangle for each of the tessellate triangles. The index entries in the index buffer are arranged in an order such that vertices of a tessellate triangle are grouped together sequentially, and the draw calls are issued such that the first set of three draw calls are for vertices of a first tessellate triangle, and the next set of three draw calls are for a replica of the first tessellate triangle, and so on. This allows the vertex shader to sequentially map the vertices of the draw calls to the proper tessellate and replica triangles.

At block 906, triangles in the set of triangles mapped at block 904 are selected for geometry expansion. For example, triangles that correspond to exterior triangles of the tessellated geometry and their replicas are selected for geometry expansion. In some implementations, the index ordering of the draw calls is used to select exterior triangles for geometry expansion. In some implementations, the vertex attributes (e.g., rendering primitive classifier) stored in the compressed vertex buffer for the corresponding vertex are used to determine whether the triangle being processed is an exterior or interior triangle. In some embodiments, vertices of triangles that are excluded from geometry expansion (e.g., interior triangles) are set to an invalid value such that a fragment shader in a subsequent stage of the rendering pipeline will discard the vertex. For example, the location of the vertex can be set to a large value that is larger than the display resolution area of the display device.

At block 908, rendering parameters are generated by the vertex shader for vertices of the triangles that are selected for geometry expansion. The rendering parameters are generated based on the vertex attributes in the vertex buffer entries of the compressed vertex buffer corresponding to the vertices of the selected triangles. In some implementations, texture coordinates are determined by mapping vertex locations of the vertices of the selected triangles to a texture space, and barycentric coordinates of the vertices of the selected triangles are determined by utilizing a geometry spread algorithm. In some implementations, the vertex shader also determines whether each vertex belongs to one of several primitive types. For instance, the vertex shader determines whether each vertex belongs to a line primitive or a degenerate primitive, for example, by determining if the three vertices of the triangle form a line or a zero-area primitive at a certain resolution when point coordinates of the triangle are transformed to the pixel space at a certain resolution. The tendering parameters are then provided to a fragment shader of the GPU.

At block 910, the vector path with antialiasing is rendered by a fragment shader using the rendering parameters generated by the vertex shader, which were derived based on the index buffer and the compressed vertex buffer. For example, the fragment shader computes signed distance values of geometric fragments based on a rasterization of the vector path, modulates color values of the vector path, and performs anti-aliasing from the curve segments based on the computed signed distance values. Color values for rendering each pixel on a display device are then outputted based on the locations of path objects with anti-aliasing applied to the corresponding path objects.

Accordingly, vector graphics techniques utilizing a compressed vertex buffer for anti-aliasing have been described. As discussed above, the vector graphics techniques described herein reduce the amount of data being transferred from the CPU to the GPU for anti-aliasing. As compared to a multi-vertex buffer system that stores vertex attributes for every vertex of the tessellate triangles including duplicate vertices of adjacent triangles, the compressed vertex buffer utilizes less memory and reduces the number of memory access cycles needed to transfer the vertex data from the CPU to the GPU. The vector graphics techniques described herein improve the rendering latency while still providing comparable quality without requiring the use of a geometry shader. The reduction in buffer size and the capability to perform anti-aliasing without utilizing a geometry shader also allow the techniques described herein to be ported to web applications and portable devices.

In some embodiments, the techniques (e.g., methods, systems, etc.) described herein are implemented using a computing system. In one example, the computing system includes a server. In another example, the computing system includes a user device, such as a desktop computer, a laptop computer, a mobile phone, a tablet computer, a gaming console, a set-top box, a wearable computing device, a network-connected computing device, or the like. In some embodiments, the computing system is implemented as a single computing device, or as multiple communicatively coupled computing devices such as a combination of servers and/or computers coupled in a wired and/or wireless network such as the Internet, wide area network (WAN), local area network (LAN), virtual private network (VPN), intranet, etc. In some implementations, the computing system includes computing devices coupled over a local connection such as WiFi, Bluetooth, USB, etc.

Figure 10:
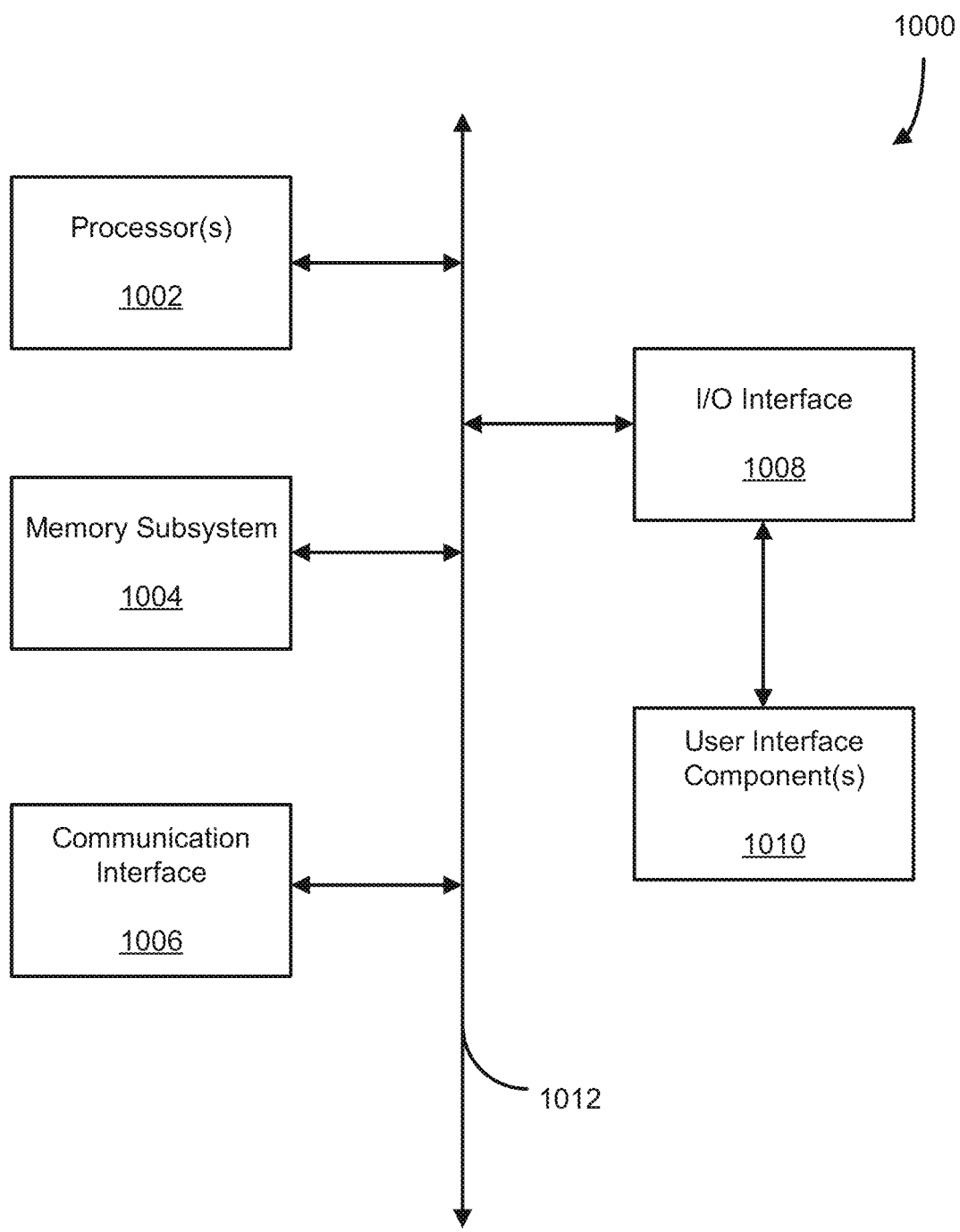
FIG. 10 illustrates a block diagram of an example of a computing device.

FIG. 10 shows a schematic diagram of components of a computing device 1000 (e.g., a computing device implemented in a computing system). As illustrated, computing device 1000 includes a bus 1012 that directly or indirectly couples one or more processors(s) 1002, a memory subsystem 1004, a communication interface 1006, an input/output (I/O) interface 1008, and/or one or more user interface components 1010. It should be noted that, in some embodiments, various other components may be included in a computing device that are not shown in FIG. 10, and/or one or more components shown in FIG. 10 can be omitted.

In some embodiments, computing device 1000 includes or is coupled to a memory subsystem 1004. Memory subsystem 1004 includes a computer-readable medium (e.g., non-transitory storage medium) or a combination of computer-readable media. Examples of computer-readable media that can be implemented in memory subsystem 1004 include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media can include non-volatile memory, volatile memory, or a combination thereof. Memory subsystem 1004 can also include one or more hardware devices such as a solid-state memory, one or more hard drives, one or more optical disk drives, or the like. In some embodiments, memory subsystem 1004 stores content files such as text-based files, audio files, image files, and/or video files, etc. The content files can include documents, pictures, photos, songs, podcasts, movies, etc. In some embodiments, memory subsystem 1004 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1002, or processor(s) of another computing device communicatively coupled to computing device 1000) to perform various operations or functions such as those described herein. In some embodiments, a computer program product is referred to as a non-transitory computer readable medium storing or comprising instructions to perform certain operations or functions. Examples of a computer program product include firmware, software driver, operating system, or software application. Examples of a software application can include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application can be implemented using one or more neural network or machine learning models. In such embodiments, one or more neural network or matching learning models can be trained using computing device 1000 (or a computing system that includes computing device 1000). Furthermore, computing device 1000 (or a computing system include computing device 100) can execute the one or more neural network or machine learning models as part of the computer program product to perform inference operations. It should be noted that the neural network or matching learning model(s) can be trained using a computing device or system that is the same as, overlaps with, or is separate from the computing device or system performing inference operations.

Communication interface 1006 is used by computing device 1000 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 1006 utilizes various drivers, wireless communication circuitry, network interface circuitry, or the like to enable communication via various communication networks.

I/O interface 1008 includes various drivers and/or hardware circuitry for receiving input from various input devices, providing output to various output devices, or exchanging input/output with various input/output devices. Devices coupled to I/O interface 1008 can include peripheral devices such as a printer, a docking station, a communication hub, a charging device, etc. Some devices coupled to I/O interface 1008 can be used as user interface component(s) 1010. For example, a user can operate input elements of user interface component(s) 1010 to invoke the functionality of computing device 1000 and/or of another device communicatively coupled to computing device 1000; a user can view, hear, and/or otherwise experience output from computing device 1000 via output elements of user interface component(s) 1010. Some user interface component(s) 1010 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. For example, one or more features from one embodiment can be combined with another embodiment to form an alternative embodiment, and/or one or more features can be omitted from an embodiment to form an alternative embodiment without departing from the scope of the disclosure. Additionally, it should be noted that certain features described herein may be utilized without reference to other features described herein.

With reference to the various processes described above, it should be understood that the order in which operations are performed is not limited to the order described herein. Moreover, in some embodiments, two or more operations may be performed concurrently and/or substantially in parallel. In some embodiments, what is described as a single operation may be split into two or more operations (e.g., performed by the same device, performed by two or more different devices, etc.). In some embodiments, what is described as multiple operations may be combined into a single (e.g., performed by the same device, etc.). Descriptions of various blocks, modules, or components as distinct should not be construed as requiring that the blocks, modules, or components be separate (e.g., physically separate) and/or perform separate operations. For example, two or more blocks, modules, and/or components may be merged. As another example, a single block, module, and/or components is split into multiple blocks, modules, and/or components.

The phrases "in one embodiment," "in an embodiment," "in one example," and "in an example" are used herein. It should be understood that these phrases may refer to the same embodiments and/or examples or to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

What is claimed is:

1. A non-transitory computer-readable medium comprising instructions that, when executed by at least one processor of a computing system, cause the computing system to:
   generate a plurality of tessellate triangles along a vector path, each of the tessellate triangles being represented by a set of vertices;
   generate an index buffer that includes a vertex index for each vertex of each of the plurality of tessellate triangles;
   generate a compressed vertex buffer by excluding duplicate vertices of the plurality of tessellate triangles, wherein each vertex buffer entry in the compressed vertex buffer corresponds to a unique vertex that maps to one or more vertex indices of the index buffer;
   provide the index buffer and the compressed vertex buffer to a graphics processing unit to render the vector path with anti-aliasing; and
   issue commands to the graphics processing unit, the commands configured to cause the graphics processing unit to:
      map vertices of the commands to a set of triangles that includes each of the tessellate triangles and a replica triangle corresponding to each of the tessellate triangles;
      select one or more triangles in the set of triangles for geometry expansion; and
      generate rendering parameters based on vertex buffer entries in the compressed vertex buffer that correspond to vertices of the selected one or more triangles to perform the geometry expansion.

2. The non-transitory computer-readable medium of claim 1, further comprising instructions that, when executed by the at least one processor of the computing system, cause the computing system to:
   issue, to a vertex shader of the graphics processing unit, the commands, the commands comprising draw calls, a number of the draw calls being equal to twice a number of vertex indices in the index buffer.

3. The non-transitory computer-readable medium of claim 1, wherein the one or more triangles selected for the geometry expansion are one or more exterior triangles and their corresponding one or more replica triangles.

4. The non-transitory computer-readable medium of claim 1, wherein each vertex buffer entry in the compressed vertex buffer includes:
   a two-dimensional set of coordinates indicating a location of the corresponding vertex;
   a one-dimensional color value representing a color of the vector path; and
   a two-dimensional set of classifiers.

5. The non-transitory computer-readable medium of claim 4, wherein the two-dimensional set of classifiers includes a rendering primitive classifier and a stroke width classifier.

6. The non-transitory computer-readable medium of claim 5, wherein the rendering primitive classifier indicates the corresponding vertex as one of an interior triangle, an exterior triangle with convex side antialiasing, an exterior triangle with concave side antialiasing, a line with anticlockwise side antialiasing, or a line with clockwise side antialiasing.

7. The non-transitory computer-readable medium of claim 1, wherein the graphics processing unit is configured to render the vector path without using a geometry shader.

8. A computer-implemented method comprising:
   receiving, by a graphics processing unit, two vertex shader draw calls for each vertex index in an index buffer that is associated with a compressed vertex buffer, wherein the index buffer includes a vertex index for each vertex of each of a plurality of tessellate triangles along a vector path, and the compressed vertex buffer includes a vertex buffer entry for each unique vertex that maps to one or more vertex indices of the index buffer;
   mapping, by the graphics processing unit, vertices of the vertex shader draw calls to a set of triangles that includes each of the tessellate triangles and a replica triangle for each of the tessellate triangles;
   selecting, by the graphics processing unit, triangles in the set of triangles for geometry expansion; and
   generating, by the graphics processing unit, rendering parameters based on vertex buffer entries in the compressed vertex buffer that correspond to vertices of the selected triangles to perform the geometry expansion.

9. The computer-implemented method of claim 8, wherein selecting the triangles for geometry expansion includes selecting exterior triangles and their corresponding replica triangles.

10. The computer-implemented method of claim 8, further comprising setting vertices of each triangle being excluded from the geometry expansion to an invalid value.

11. The computer-implemented method of claim 8, wherein each vertex buffer entry of the compressed vertex buffer includes a x-coordinate of the corresponding vertex, a y-coordinate of the corresponding vertex, a color value, a rendering primitive classifier, and a stroke width classifier.

12. The computer-implemented method of claim 8, wherein generating the rendering parameters of the selected triangles includes:
   determining, by the graphics processing unit, texture coordinates by mapping vertex locations of the vertices of the selected triangles to a texture space; and
   determining, by the graphics processing unit, barycentric coordinates of the vertices of the selected triangles by utilizing a geometry spread algorithm.

13. The computer-implemented method of claim 11, further comprising:
   rendering, by the graphics processing unit utilizing a fragment shader, the vector path with antialiasing based on the rendering parameters.

14. A computing system comprising:
   at least one processor; and
   a graphics processing unit coupled to the at least one processor,
   wherein the at least one processor is configured to:
      generate an index buffer that includes a vertex index for each vertex of a plurality of tessellate triangles along a vector path;
      generate a compressed vertex buffer, wherein each vertex buffer entry in the compressed vertex buffer corresponds to a unique vertex that maps to one or more vertex indices of the index buffer;

provide the index buffer and the compressed vertex buffer to the graphics processing unit, and issue commands to the graphics processing unit; and wherein the graphics processing unit is configured to:

map vertices of the commands to a set of triangles that includes each of the tessellate triangles and a replica triangle corresponding to each of the tessellate triangles;

select one or more triangles in the set of triangles for geometry expansion;

generate rendering parameters based on vertex buffer entries in the compressed vertex buffer that correspond to vertices of the selected one or more triangles to perform the geometry expansion; and render the vector path with antialiasing based on the index buffer and the compressed vertex buffer.

15. The computing system of claim 14, wherein the issued commands comprise draw calls, and a number of the draw calls are equal to twice a number of vertex indices in the index buffer.

16. The computing system of claim 14, wherein the graphics processing unit is configured to set vertices of each triangle being excluded from the geometry expansion to an invalid value for a fragment shader.

17. The computing system of claim 14, wherein the graphics processing unit is configured to:

determine texture coordinates by mapping vertex locations of the vertices of the selected one or more triangles to a texture space; and determine barycentric coordinates of the vertices of the selected one or more triangles by utilizing a geometry spread algorithm.

18. The computing system of claim 14, wherein each vertex buffer entry in the compressed vertex buffer includes:

a two-dimensional set of coordinates indicating a location of the corresponding vertex;

a one-dimensional color value representing a color of the vector path; and a two-dimensional set of classifiers including a rendering primitive classifier and a stroke width classifier.

* * * * *